(12) United States Patent
Mills et al.

(10) Patent No.: US 12,335,567 B1
(45) Date of Patent: Jun. 17, 2025

(54) CHANGE REQUESTS IN MEDIA BROADCAST CONTENT DISTRIBUTION SYSTEM

(71) Applicant: iHeart Media Management Services, Inc., San Antonio, TX (US)

(72) Inventors: Steve Mills, San Antonio, TX (US); Jeffrey Lee Littlejohn, Cincinnati, OH (US); David C. Jellison, Jr., Austin, TX (US); Vijay Jayakumar, San Antonio, TX (US); Riad Edelbi, San Antonio, TX (US); Adam Zastawski, San Antonio, TX (US); José Antonio Carbajal Orozco, San Antonio, TX (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

(21) Appl. No.: 18/443,805

(22) Filed: Feb. 16, 2024

Related U.S. Application Data

(63) Continuation of application No. 17/678,243, filed on Feb. 23, 2022, now Pat. No. 11,943,504.

(51) Int. Cl.
*H04N 21/443* (2011.01)
*H04N 21/23* (2011.01)
(Continued)

(52) U.S. Cl.
CPC ... *H04N 21/4431* (2013.01); *H04N 21/23424* (2013.01); *H04N 21/2407* (2013.01);
(Continued)

(58) Field of Classification Search
CPC ......... H04N 21/4431; H04N 21/23424; H04N 21/2407; H04N 21/4622; H04N 21/812;
(Continued)

(56) References Cited

U.S. PATENT DOCUMENTS 10,827,214 B1   11/2020  Thapaliya
2001/0000194 A1*  4/2001  Sequeira ............... H04N 21/235
                                                    725/39
(Continued)

OTHER PUBLICATIONS

Cahill, Mark, "Building a Microservice API Gateway for iHeartRadio's Radio Station Network with GraphQL," Oct. 22, 2018, 17 pages.
(Continued)

*Primary Examiner* — Cynthia M Fogg
(74) *Attorney, Agent, or Firm* — Harness, Dickey & Pierce, P.L.C

(57) ABSTRACT

A method includes providing a media playout system (MPS) access to a plurality of media automation services via a master API. The MPS transmits media station content to end-users. The master API transmits, to the MPS, at least one media delivery schedule indicating scheduled media items to be transmitted by the media playout system to the end-users, and receives a change request from a first media playout system. The change request indicates a requested change in one or more media items scheduled for transmission by the media playout system to the end-users. The API transmits the change request to a first media automation service, selected by the master API based on the requested change, receives from the first media automation service updated media delivery information responsive to the change request, and transmits the updated media delivery information from the master API to the first media playout system.

20 Claims, 15 Drawing Sheets

(51) Int. Cl.
*H04N 21/234* (2011.01)
*H04N 21/24* (2011.01)
*H04N 21/462* (2011.01)
*H04N 21/81* (2011.01)

(52) U.S. Cl.
CPC ....... *H04N 21/4622* (2013.01); *H04N 21/812* (2013.01); *H04N 21/23* (2013.01)

(58) Field of Classification Search
CPC ............... H04N 21/23; H04N 21/2668; H04N 21/44218; H04N 21/2385; H04N 21/47202; H04N 21/6405; H04N 21/6582; H04N 21/25891; H04N 21/8456; H04N 21/26258; G06Q 30/0241; H04L 65/611
USPC .......................................................... 725/22
See application file for complete search history.

(56) References Cited

U.S. PATENT DOCUMENTS

| | | |
|---|---|---|
| 2008/0167957 A1 | 7/2008 | Steelberg et al. |
| 2010/0299437 A1 | 11/2010 | Moore |
| 2016/0073176 A1 | 3/2016 | Phillips et al. |
| 2017/0262865 A1 | 9/2017 | Littlejohn et al. |
| 2017/0374116 A1 | 12/2017 | Phillips et al. |
| 2019/0246158 A1 | 8/2019 | Martell |
| 2021/0099759 A1 | 4/2021 | Armstrong et al. |
| 2021/0204009 A1 | 7/2021 | Levin et al. |
| 2021/0368215 A1 | 11/2021 | Richman et al. |
| 2021/0409110 A1 | 12/2021 | Chakraborty et al. |
| 2022/0014575 A1 | 1/2022 | Corl |
| 2022/0014579 A1 | 1/2022 | Bachmutsky et al. |
| 2022/0046302 A1 | 2/2022 | Shanson et al. |
| 2022/0245675 A1 | 8/2022 | Mochrie et al. |
| 2022/0321663 A1 | 10/2022 | Benson |
| 2022/0337910 A1 | 10/2022 | Delgado |
| 2023/0124840 A1* | 4/2023 | Giladi ................ H04N 21/4334 386/241 |
| 2023/0140859 A1 | 5/2023 | Fujiwara et al. |
| 2024/0201923 A1* | 6/2024 | Bertrand .......... H04N 21/41415 |

OTHER PUBLICATIONS

Nang, Kailuo, "Why we picked AKKA cluster as our microservice framework," Feb. 3, 2016, 6 pages.

* cited by examiner

Media Management System 425

Log Management System 490

Programmatic Advertisement Insertion System 545

Disaster Recovery System 920

Computing System 1200

CHANGE REQUESTS IN MEDIA BROADCAST CONTENT DISTRIBUTION SYSTEM

CROSS REFERENCE TO RELATED PATENTS/APPLICATIONS

The present U.S. Utility Patent application claims priority pursuant to 35 U.S.C. § 120 as a continuation of U.S. application Ser. No. 17/678,243, filed Feb. 23, 2022, entitled "MEDIA BROADCAST CONTENT DISTRIBUTION SYSTEM," which is related to Utility application Ser. No. 17/678,263, filed on Feb. 23, 2022, and entitled "DISASTER RECOVERY IN MEDIA BROADCAST SYSTEM", which are incorporated by reference herein for all purposes.

BACKGROUND OF THE INVENTION

1. Technical Field of the Invention

This invention relates generally to media broadcasting, and more particularly to a media broadcast content distribution system.

2. Description of Related Art

The back-end of many media delivery systems operate using monolithic enterprise applications, batch processing and integration, which results in duplicated data and other inefficiencies. Additionally, Back-end of media delivery systems must fetch data from various sources that may not have real-time data, resulting in the potential to cause errors when combining data. Furthermore, terrestrial broadcast stations currently have limited means of operating when communication between a radio station and conventional media automation and control systems are severed.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
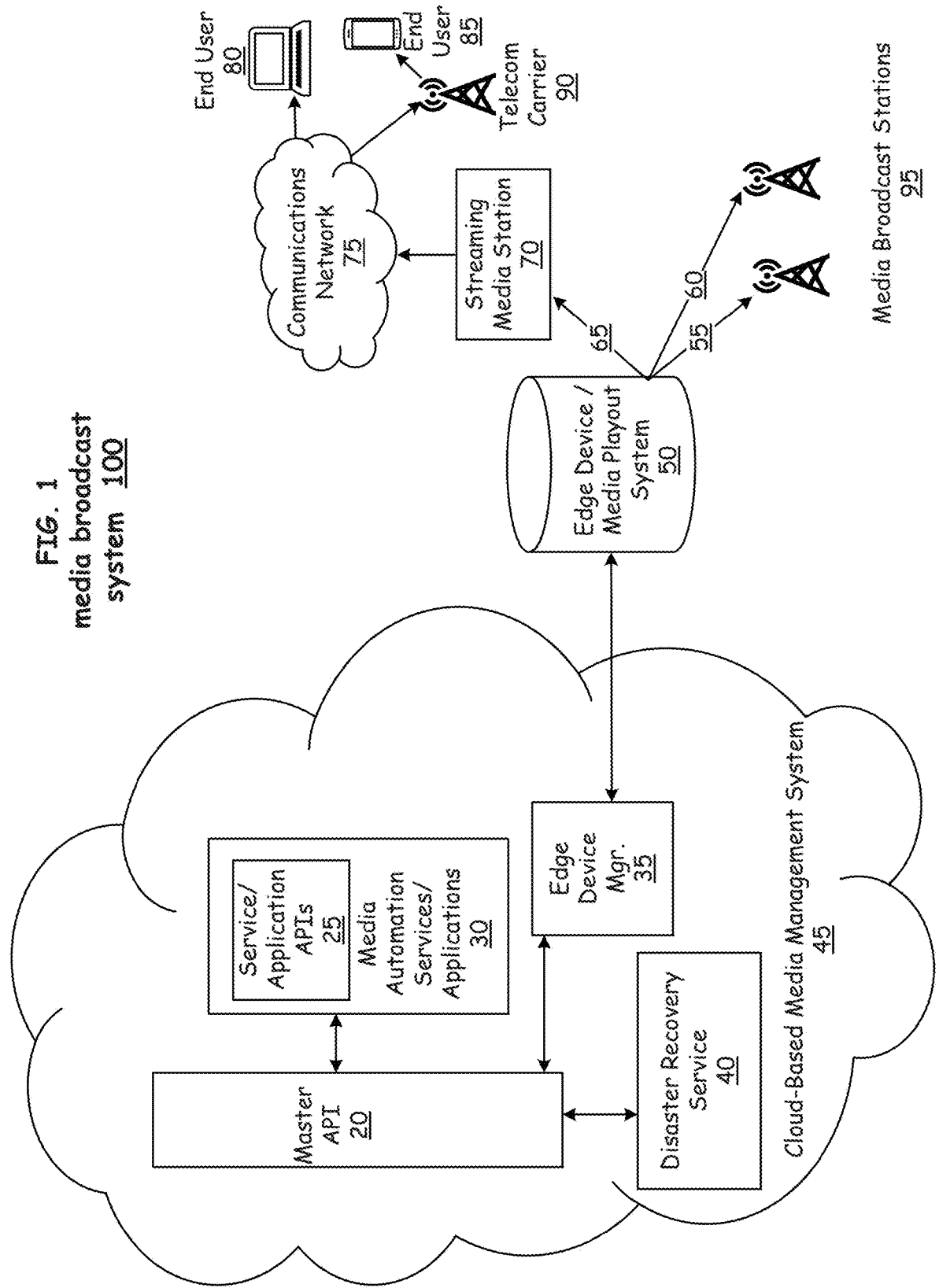
FIG. 1 is a schematic block diagram of a media broadcast system in accordance with embodiments of the present disclosure.

Instead relying on monolithic media automation systems to provide all or most backend services broadcast systems needed for automated broadcast of media content, various embodiments of media management and/or broadcast systems disclosed herein use multiple microservice applications accessed through a common application programming interface (API). The microservice applications provide limited functionality individually, but in combination provide at least as much functionality as that provided by conventional monolithic media automation systems. The microservices operate independently of one another, and communicate amongst themselves and with one or more broadcast systems in real-time via an application programming interface. The independent operation of the microservice applications allows for media management operations for multiple broadcast systems to be more easily distributed, while the common, or shared, API allows coordination of the independent microservice applications, and facilitates ease of access by multiple broadcast stations.

The near real time nature of the data provided by the individual microservices improves the effectiveness of automated media delivery techniques, including programmatic advertisement insertion techniques, especially when media content scheduled for delivery requires modification. Additionally, various embodiments of media management and/or broadcast systems employing one or more of the microservices configurations and/or associated API(s) disclosed herein, provide improved disaster recovery capabilities in comparison to conventional, monolithic media automation systems.

Microservices can be implemented using a Command and Query Responsibility Segregation (CQRS) architecture, an Event Driven architecture, sometimes referred to as an Event Sourcing architecture, or a combination of the two. The microservices themselves can be stateful, i.e., the microservices store session information associated with service requests, or stateless, i.e., the microservices do not maintain session states between requests. In some embodiments, one or more of the microservices may be implemented as a persistence microservice, which can be used to provide durable storage, or as an aggregator microservice, which is used for workflows.

In various embodiments, an application program interface (API) implemented by a processing device including a processor and associated memory, is used to facilitate asynchronous communication between one or more microservices, and one or more one or more broadcast systems. The API receives broadcast-related information from multiple media automation applications. Receiving the broadcast-related information can include, but is not limited to the following: receiving a traffic log from a first media automation application, and receiving spot information from at least a second media automation application. The first media automation application is configured to generate a traffic log associated with a media station, and the spot information is associated with spots included in the traffic log. The API stores the broadcast-related information received from the microservices in one or more databases, and transmits the broadcast-related information to a media playout system in response to a request from that media playout system.

In various embodiments, the API receives, from the media playout system, an affidavit including as-played information, which indicates a playout status of the media content. The API then transmits the affidavit to the at least a second media automation application.

In some implementations, the API receives, from the media playout system, a request for the traffic log, and in response to the request, transmits the traffic log from the API to the media playout system. The API can also receive, from the first media automation application, asset identifiers for media items associated with the traffic log, storing the asset identifiers, and transmit the asset identifiers from storage to the media playout system.

In various implementations, the API receives, from the at least a second media automation application, media address information indicating a location from which to obtain media items associated with the at least a second media automation application. The API obtains the media items using the media address information, stores the media items, and transmits an affidavit including the media address information from the API to a third media automation application.

The API may transmit, to the at least a second media automation, a first affidavit to indicating a time at which the media playout system begins playout of a spot; and a second affidavit from the API application indicating the time at which the media playout system began playout of the spot, a time at which the media playout system finished playout of the spot; and a uniform resource locator (URL) associated with the spot.

In other implementations, the API transmits one or more requests for broadcast information to one or more traffic and continuity applications, wherein the broadcast information includes information related to media broadcasts of a plurality of media stations. The API receives the broadcast information, and stores it to generate cached broadcast information. In response to receiving, from a media playout system, a request for at least a portion of the cached broadcast information, the API transmits, to the media playout system, the at least a portion of the cached broadcast information.

Additionally, the API can receive updated broadcast information from the one or more traffic and continuity applications, store the updated broadcast information to generate updated cached broadcast information, and transmit the updated cached broadcast information transmitting to the media playout system.

The API may also receive a request for spot information. In response to the request for spot information, the API transmits a response including spot schedule information and an address from which media content associated with the spot can be requested.

Additionally, the API can receive, from the one or more traffic and continuity applications, media address information associated with media assets stored in a media vault. The API can store the media address information as stored media address information, and transmit the stored media address information to the media playout system. In some embodiments, the media playout system interfaces with other media playout systems associated with other media stations.

The API can, in various implementations, receive a trigger message 590 generated by a log manager. The trigger message identifies at least one broadcast log ready for dissemination to one or more of the individual media stations. In response to receiving the trigger message, the API automatically obtains spot information associated the at least one broadcast log.

The API can also obtain, from a programmatic advertisement application, a spot schedule indicating advertisement content to be inserted into a media broadcast, and transmit, to the programmatic advertisement application, a first affidavit indicating that playout of the advertisement content has begun; and transmit, from the API to the programmatic advertisement application, a second affidavit indicating that playout of the advertisement content has been completed.

A processing system configured to implement various methods described herein includes a processor configured implement an application program interface (API). In some embodiments, an API includes an ingestion module configured to: receive a traffic log from a log manager, wherein the traffic log includes spot breaks; receive, from a plurality of media automation applications, spot break information including spot metadata associated with the spot breaks; retrieve, based on the spot metadata, a media item to be inserted in a spot break; cache the media item at a storage location within a storage database; and store the spot break information in a relational database, wherein the relational database links the spot break information to the storage location of the media item within the storage database. The API further includes a break information module configured to: transmit the spot break information to a media playout system; and an affidavit module configured to receive playout affidavits posted by the media playout system, and forward the playout affidavits to one or more media automation applications of the plurality of media automation applications.

In some implementations, the break information module is further configured to receive, from the media playout system, a request for at least a portion of the spot break information. In at least one embodiment, the media playout system is implemented as a cloud-based playout system configured to interface with a plurality of individual media playout systems associated with individual media stations. In response to receiving a request for spot break information, a break information module transmits the at least a portion of the spot break information, and the storage location of the media item within the storage database, to the media playout system.

The ingestion module can be further configured to receive a trigger message generated by the log manager, wherein the trigger message identifies at least one broadcast log ready for dissemination to one or more individual media stations. The ingestion module can automatically obtain spot information associated with the broadcast log in response to receiving the trigger message. The ingestion module can also receive, from a programmatic advertisement application, a spot schedule indicating advertisement content to be inserted into a media broadcast. In some implementations, the ingestion module retrieves a media item from a media repository, and caches the media item in the storage database.

The affidavit module can receive, from the media playout system, a first playout affidavit indicating that playout the advertisement content has begun, which the affidavit module transmits to the programmatic advertisement application. Additionally, the affidavit module may receive a second playout affidavit from the media playout system, where the second affidavit indicates that playout of the advertisement content has been completed. The affidavit module automatically transmits the second playout affidavit to the programmatic advertisement application.

Various embodiments of a media broadcast system described herein include disaster recovery capabilities. In some such embodiments, an edge device including a processor and associated memory remotely access cloud-based media automation services by pointing an interface of the edge device to a cloud-based sequencer. The term "sequencer," as used herein, refers generally to a device or application software that can obtain, organize, arrange, schedule, and/or assemble media items for playback via over-the-air broadcast, streaming, or the like. From the cloud-based sequencer, the edge device obtains broadcast logs defining a broadcast schedule, and media files specified in the broadcast logs. The edge device stores local versions of the broadcast logs and local versions of the media files in a storage device locally accessible to the edge device. The edge device monitors availability of the cloud-based sequencer, and in response to determining that the cloud-based sequencer is unavailable to the edge device, points the interface of the edge device to a local sequencer included in the edge device. Local sequencer emulates one or more media automation services normally provided by the cloud-based sequencer. In response to determining that the availability of the cloud-based sequencer has been restored, the edge device re-points its interface to the cloud-based sequencer.

In at least one embodiment, storing local versions of the broadcast logs and media files includes storing media files referenced in a plurality of broadcast logs, covering a plurality of upcoming broadcast periods. The edge device provides the local versions of the media files for broadcast in accordance with the local versions of the broadcast logs during periods of time when the interface of the edge device is pointed to the local sequencer. In some such embodiments, during periods of time when the interface of the edge device is pointed to the local sequencer, the local sequencer maintains offline reconcile logs, which record any discrepancies between an actual broadcast and a broadcast schedule defined by the local versions of the broadcast logs. In response to determining that the availability of the cloud-based sequencer has been restored, the edge device transmits the reconcile logs to the cloud-based sequencer.

In some implementations, in response to determining that the availability of the cloud-based sequencer has been restored, a local sequencer associated with one edge device negotiates with local sequencers associated with other edge devices to determine a local sequencer priority.

In some embodiments, an edge device continually monitors messages from an edge-device manager, and determines the availability of the cloud-based sequencer based on the messages from the edge-device manager. In some such embodiments, the availability of the cloud-based sequencer is determined based on the content of messages received from the edge-device manager, the fact that one or more messages have been received from the edge-device manager, failure to receive one or more messages from the edge-device manager, or some combination thereof.

In at least one embodiment, the edge device provides playout services for multiple radio stations both during periods of time when the interface of the edge device is pointed to the cloud-based sequencer, and during periods of time when the interface of the edge device is pointed to the local sequencer.

In some embodiments, an edge device includes a processor and associated memory configured to implement a local sequencer, an offline controller, a media playout system, and a content replication service. The offline controller is configured to: monitor availability of a cloud-based sequencer providing media automation services to the edge device, wherein the media automation services include content, schedule, traffic, and advertisement insertion services; point an interface of the edge device to the cloud-based sequencer during periods of time when the cloud-based sequencer is available; and point the interface of the edge device to a local sequencer included in the edge device during periods of time when the cloud-based sequencer is unavailable.

During periods of time when the edge device is pointed to the cloud-based sequencer: the edge device is configured to receive, from the cloud-based sequencer, broadcast logs defining a broadcast schedule and media files specified in the broadcast logs; the content replication service is configured to store local versions of the broadcast logs and local versions of the media files in a local storage device accessible to the media playout system; and the media playout system obtains the media automation services from the cloud-based sequencer.

During periods of time when the edge device is pointed to the local sequencer: the local sequencer emulates the media automation services normally provided by the cloud-based sequencer; and the offline controller routes requests by the media playout system for media automation services to the local sequencer.

In some embodiments, during the periods of time when the edge device is pointed to the cloud-based sequencer, the content replication service stores sufficient logs and broadcast content to allow the media playout system to broadcast media content for a plurality of days without access to the cloud-based sequencer.

In at least one embodiment, the local sequencer is configured to: store reconcile logs during periods of time when the interface of the edge device is pointed to the local sequencer; and in response to the edge device determining that the availability of the cloud-based sequencer has been restored, transmit the reconcile logs to the cloud-based sequencer.

In some implementations, the offline controller can include a negotiation module, configured to negotiate with local sequencers associated with other edge devices to determine a local sequencer priority in response to determining that the availability of the cloud-based sequencer has been restored. The offline controller can also include a status module configured to: continually monitor messages from an edge-device manager; and determine the availability of the cloud-based sequencer based on the messages from the edge-device manager.

In some implementations, the status module is configured to determine the availability of the cloud-based sequencer based on at least one of: content of a message received from the edge-device manager; the fact that one or more messages have been received from the edge-device manager; or failure to receive one or more messages from the edge-device manager.

In various implementations, the media playout system provides playout services for a plurality of radio stations during periods of time when the interface of the edge device is pointed to the cloud-based sequencer, and during periods of time when the interface of the edge device is pointed to the local sequencer.

A system in accordance with some embodiments includes a processing system configured to implement a cloud-based sequencer serving media streaming end user devices and at least one edge device serving a plurality of media broadcast stations; backend systems and services, accessible through the cloud-based sequencer, wherein the cloud-based sequencer delivers media automation services provided by the backend systems and services; and an edge device. The edge device includes a processor and associated memory configured to implement a local sequencer, an offline controller, a media playout system, and a content replication service.

The offline controller, in at least one embodiment, is configured to: monitor availability of a cloud-based sequencer delivering media automation services to the edge device, wherein the media automation services include content, schedule, traffic, and advertisement insertion services; point an interface of the edge device to the cloud-based sequencer during periods of time when the cloud-based sequencer is available; and point the interface of the edge device to a local sequencer included in the edge device during periods of time when the cloud-based sequencer is unavailable.

In some such embodiments, during periods of time when the edge device is pointed to the cloud-based sequencer: the edge device is configured to receive, from the cloud-based sequencer, broadcast logs defining a broadcast schedule and media files specified in the broadcast logs; the content replication service is configured to store local versions of the broadcast logs and local versions of the media files in a local storage device accessible to the media playout system; and the media playout system obtains the media automation services from the cloud-based sequencer. During periods of time when the edge device is pointed to the local sequencer: the local sequencer emulates the media automation services normally provided by the cloud-based sequencer; and the offline controller routes requests by the media playout system for media automation services to the local sequencer.

In some embodiments, during the periods of time when the edge device is pointed to the cloud-based sequencer, the cloud-based sequencer configured to deliver sufficient logs and broadcast content to the edge device to allow the edge device to broadcast media content for a plurality of days without access to the cloud-based sequencer.

The cloud-based sequencer is, in at least one implementation, configured to: in response to the edge device reconnecting to the cloud-based sequencer after a period of time when the edge device has been disconnected from the cloud-based sequencer, receive reconcile logs from the edge device.

The cloud-based sequencer can also include an edge device manager associated with the cloud-based sequencer, wherein the edge device manager is configured to transmit status messages to the edge device, wherein the status messages indicate availability of the cloud-based sequencer.

In some embodiments, end-user devices can be used to determine that the cloud-based sequencer is unavailable, and in response to at least one media streaming end-user device determining that the cloud-based sequencer is unavailable, the at least one media streaming end-user device communicates directly with the backend systems and services.

In other implementations, at least one of the backend systems and services determines that the cloud-based sequencer is unavailable; and in response to determining that the cloud-based sequencer is unavailable, the at least one of the backend systems and services initiates direct communication with the media streaming end user devices. Further explanations regarding the above mentioned embodiments, and others, are provided with reference to FIGS. 1-17.

Referring first to FIG. 1, a media broadcast system 100 will be discussed in accordance with embodiments of the present disclosure. Media broadcast system 100 includes cloud-based media management system 45, edge device/media playout system 50, streaming media station 70, and media broadcast stations 95. Streaming media station 70 provides streaming media to first end user 80 via communications network 75, and to second end user 85 via communications network 75 and telecommunications carrier 90.

Cloud-based media management system 45 includes master application program interface (API) 20, which communicates with media automation services/applications 30, through service/application APIs 25. Although illustrated by a single box, media automation services/applications 30 can be, and often are, implemented in a distributed manner, with different processing devices implementing one or more individual services or applications.

Cloud-based media management system 45 optionally includes disaster recovery service 40, and edge device manager 35. In various embodiments, edge device edge device/media playout system 50 is part of a media playout system, is associated with a media playout system, or includes a media playout system. Edge device/media playout system 50 transmits first media content 65 to streaming media station 70, which converts the first media content 65 into one or more media streams to be delivered to end user 80 and/or end user 85. Edge device/media playout system 50 transmits second media content 60 and third media content 55 to one or more to streaming media broadcast stations 95, which can be, for example, over-the-air radio broadcast stations. Media broadcast stations 95 broadcast second media content 60 and/or third media content 55. In various embodiments, first media content 65, second media content 60 and third media content 55 include substantially all primary and advertising content to be broadcast or streamed, so that media broadcast stations 95 and streaming media station 70 need only modulate or otherwise format the content for transmission, without altering the content itself. For example, third media content 55 may include a fully assembled broadcast, which is modulated onto a carrier frequency for over-the air transmission by one of the media broadcast stations 95.

In some such embodiments, the media broadcast stations 95 and the streaming media station 70 make no decisions about what content is to be broadcast. In other embodiments, the media broadcast stations 95 and the streaming media station 70 can insert additional or replacement content, for example station identification content required of broadcasters, local advertisements, or local primary content. However, in at least one embodiment, media broadcast stations 95 and the streaming media station 70 are not configured to insert such additional or replacement content.

In an example of operation, edge device/media playout system 50 obtains schedules, primary content, advertising content, and tertiary content from media automation services/applications 30 via master API 20, which are included in cloud-based media management system 45. Edge device/media playout system 50 assembles the content into first media content 65, second media content 60 and third media content 55, which is eventually delivered to end users via streaming media station 70 or media broadcast stations 95.

As used herein, the term "primary content" refers to non-advertisement programming, shows, entertainment content, news, traffic, weather, music, or the like. The term "advertising content" refers to advertisements inserted into designated spots within a media broadcast schedule. "Tertiary content" refers to content such as filler material, station identifiers, liners or other content generated by on-air personalities, and the like.

In some embodiments, discussed further with reference to FIGS. 11-16, edge device/media playout system 50 operates to provide first media content 65, second media content 60 and third media with content 55, both during times when cloud-based media management system 45 is available, and during times when it is not.

During times when cloud-based media management system 45 is available, it provides logs, advertisements, content, and other media automation services by routing communications between media automation services/applications 30 and edge device/media playout system 50 through master API 20. For example, media automation services/applications 30 can include one or more of a log management service or application, an advertisement service or application, a media management service or application, and the like.

In an example of operation, master API 20 obtains information from media automation services/applications 30, and provides that information to disaster recovery service 40, which stores the information and provides it to assist edge device/media playout system 50 to recover after a failure or loss of network communication, and to edge device/media playout system 50, which uses the information to generate the media content delivered to end users via streaming media station 70 or media broadcast stations 95.

As used herein, the term "log," or "broadcast log" refers to an ordered broadcast schedule that includes information identifying particular items to be broadcast or streamed at particular times. A log normally includes time slots for insertion of primary content, time slots for insertion of advertising content, and time slots for insertion of certain tertiary content; although the tertiary content is sometimes inserted into slots designated for primary or advertising content. The information in the log that identifies particular items can include titles, addresses from which the items can be obtained, or the like. Although a log can be said to include the media items to be broadcast, logs usually include information identifying the content or a location from which the content can be obtained.

A log is generally created from a "clock," which can include time slots and content type identifiers. Once particular items are designated to fill particular time slots, the clock with populated time slots is referred to as a log. Note that in some cases, the term "log" is also used herein to refer to a record of something that has happened. The meaning of the term "log" will be apparent by its context, and if not, the specific meaning will be indicated.

Note that the term "spot" is sometimes used to refer to advertisements themselves, and at other times used to refer to a time slot in a log that is reserved for an advertisement. Thus, a spot (a position in a log) can be filled by a spot (an advertisement). The meaning of the term "spot" will be apparent by its context, and if not, the specific meaning will be indicated.

Edge device manager 35 can be used to determine a change in the operational status of master API 20, disaster recovery service 40, media automation services/applications 30, and/or edge device/media playout system 50. Edge device manager 35 can also be used to perform other management functions related to edge device/media playout system 50.

In at least one embodiment, edge device manager 35 monitors communications between master API 20 and edge device/media playout system 50. If no messages are transmitted from edge device/media playout system 50 to master API 20 within a threshold period of time, but messages are being transmitted from master API 20 to edge device/media playout system 50, edge device manager 35 can conclude that edge device/media playout system 50 is offline. In response to the offline determination, edge device manager 35 can transmit a message notifying master API 20 of the offline determination. In some such embodiments, master API 20 continues to transmit information intended for edge device/media playout system 50 to disaster recovery service 40.

In other embodiments, if no messages are transmitted from master API 20 to edge device/media playout system 50 within a threshold period of time, but messages are being transmitted from edge device/media playout system 50 to master API 20, edge device manager 35 can conclude that master API 20 is offline, and notify edge device/media playout system 50 to enter a local mode in which a local sequencer emulates the media automation services/applications 30.

In some embodiments, edge device manager 35 monitors the status of master API 20 and edge device/media playout system 50 independently of communications between the two. For example, edge device manager 35 can employ heartbeat messages with either or both of the master API 20 and edge device/media playout system 50. In other embodiments, edge device manager 35 can evaluate the quality of one or more transmission paths, and whether the master API is available to edge device/media playout system 50 based on the quality of the one or more transmission paths. In some embodiments, edge device manager 35 can receive messages from other edge device/media playout systems (not illustrated) that indicate unavailability of media automation services/applications 30 and/or unavailability of master API 20.

In various embodiments, edge device manager 35 controls an operating mode of one or more edge device/media playout systems, each of which can be associated with one or more media stations. The operating modes can include an "online" mode, in which edge device/media playout system 50 obtains broadcast information originating from media automation services/applications 30 via master API 20 in near real time; a "disaster recovery mode" in which edge device/media playout system 50 obtains information from disaster recovery service during recovery from "local" mode; and a "local" mode, in which edge device/media playout system 50 obtains broadcast information stored locally, and emulates the services provided by media automation services/applications 30.

Edge device manager 35 can issue commands that command, instruct, or force control edge device/media playout system 50 to enter certain states, or transmit messages that edge device/media playout system 50 can use as input to determine whether it should change states. Other management functions that can be performed by edge device manager 35 include, but are not limited to, re-direction of all messages from edge device/media playout system 50 to an alternate master API (not illustrated), load balancing during disaster recovery to ensure that current content is provided from media automation services/applications 30 while still allowing backup content to be recovered from disaster recovery service 40, caching information to account for variations in network latency and/or bandwidth, or the like.

Figure 2:
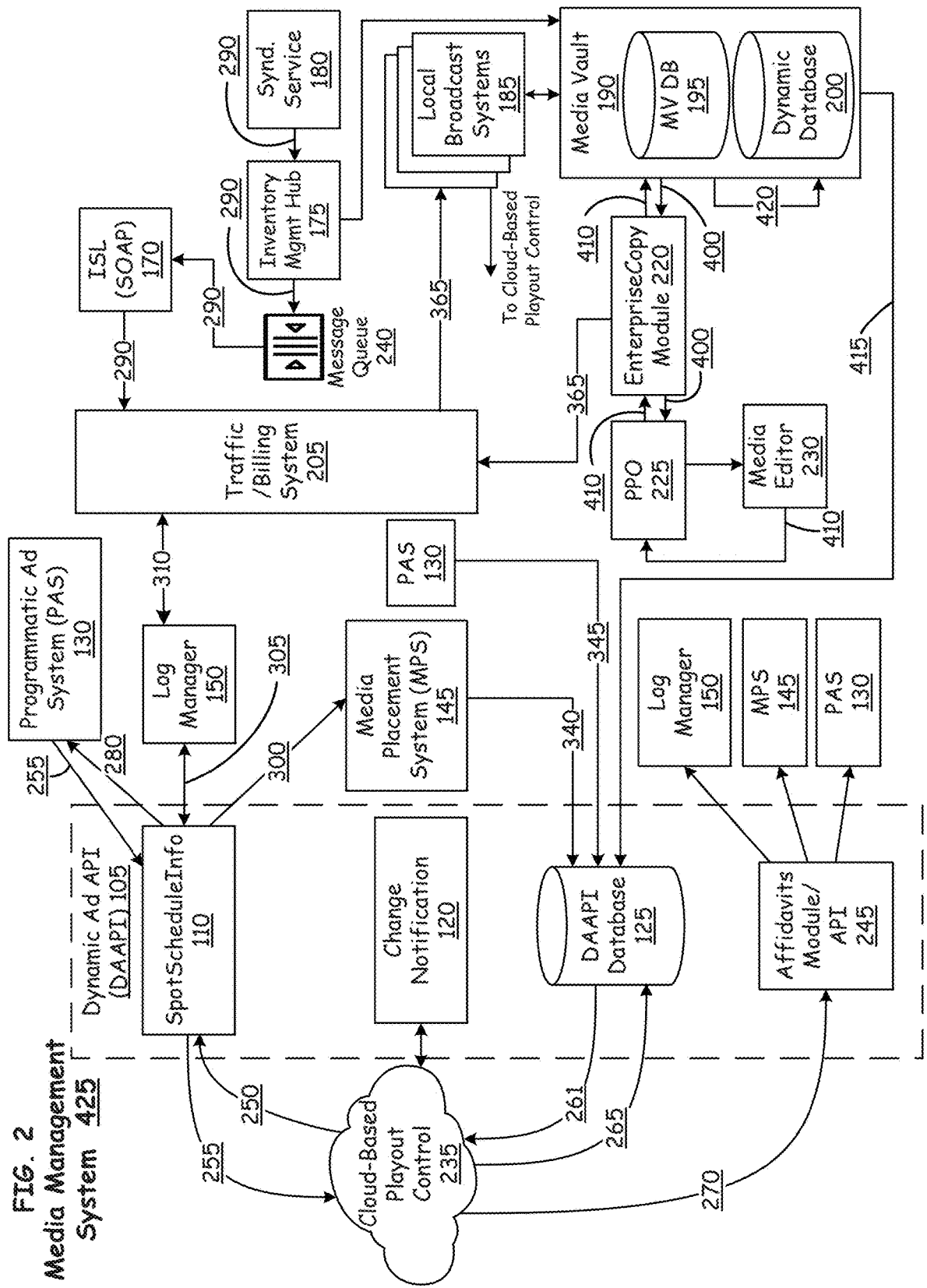
FIG. 2 is a schematic block diagram of a media management system in accordance with embodiments of the present disclosure.

Referring next to FIG. 2, a media management system 425 will be discussed in accordance with various embodiments of the present disclosure. Media management system 425 includes cloud-based playout control system 235; Dynamic Ad API (DAAPI) 105, which includes spot schedule information module 110, change notification module 120, DAAPI database 125, and Affidavits module/API 245; programmatic advertisement system 130; log manager 150; Media Placement System 145; traffic system 205; integrated services layer 170; message queue 240; inventory management hub 175; syndicated content service 180; paperless production workflow system (PPO) 225; media editor 230; Enterprise Copy module 220; multiple instances of local broadcast systems 185, each of which is associated with one or more separate broadcast, streaming, or other playout systems; and media vault (MV) 190, which includes MV database 195, and Dynamic Database 200, which can function as an event manager in some implementations.

Cloud-based playout control system 235 can be implemented using one or more processing systems that may, but need not be, hosted remotely from some or all of the other elements of media management system 425. In various embodiments, Cloud-based playout control system 235 provides cloud based control of local broadcast systems 185, and can include edge device manager 35 (FIG. 1), and edge device media playout system 50 (FIG. 1), and in some embodiments disaster recovery service 40 (FIG. 1). Cloud-based playout control system 235 obtains information used by local broadcast systems 185 to broadcast and/or stream media content as specified in one or more broadcast logs.

In embodiments where cloud-based playout control system 235 includes disaster recovery capabilities, cloud-based playout control system 235 can obtain, through Dynamic Ad API (DAAPI) 105, information to be provided to local broadcast systems 185, to allow each of the local broadcast systems to recover to a current state. As used in this context, a "current state" refers to the state in which a local broadcast system should be operating at the time of recovery from a network outage or other failure that prevents local broadcast systems 185 from receiving information necessary for media broadcast through DAAPI 105. For example, if a network outage occurs at 10:00 am, and is resolved a 10:20 am, the "current state" refers to a state local broadcast system would have been in at 10:20 am if no network outage had occurred. Disaster recovery implementations are discussed in greater detail with respect to FIGS. 11-16.

In various embodiments, cloud-based playout control system 235 transmits spot information request 250 to spot schedule information module 110, which is included in Dynamic Ad API (DAAPI) 105. The spot information request 250 can include, for example, a request for information related to a single spot referenced in a broadcast log, information related to all spots referenced in a broadcast log, information for new, or changed spots, a request for a broadcast log, or the like. The spots can be local spots scheduled for broadcast on one or more particular local broadcast systems, national spots, or the like.

In response to spot information request 250, spot schedule information module 110 transmits a spot information response 255 to Cloud-based playout control system 235. In at least one embodiment, the spot information response 255 includes information indicating a location at which a spot (media item) referenced in a broadcast log can be retrieved from DAAPI database 125, all or a portion of a broadcast log associated with the spot, information identifying a local broadcast system scheduled to broadcast the spot, or the like.

For example, spot information response 255 can include a uniform resource locator (URL) that can be used to send a download request 265 to DAAPI database 125. The download request 265 includes, but is not limited to a request for the DAAPI database 125 to transmit a spot to cloud-based playout control system 235, and can include an address within DAAPI database 125 from which the spot can be retrieved. In response to the download request, DAAPI database 125 transmits a download response 261 that includes the requested spot to Cloud-based playout control system 235.

Cloud-based playout control system 235 can also provide and/or receive affidavits 270 from affidavits module/API 245, which is included in Dynamic Ad API (DAAPI) 105. Affidavits can include messages from local broadcast systems 185, edge devices, advertisement/media insertion systems, or other media playout systems, where the affidavits indicate a playout status of one or more media items. For example, a media station associated with a particular local broadcast system can generate and transmit an affidavit indicating that a media item scheduled for transmission/broadcast has been transmitted successfully, that transmission/broadcast of a media item has been only partially completed, that transmission/broadcast of a media item has failed, a time at which transmission/broadcast of a media item has been started or completed, or the like. In addition to providing affidavits to, and receiving affidavits from, cloud-based playout control system 235, affidavits module/API 245 also transmits various affidavits to log manager 150, media placement system (MPS) 145, and programmatic ad system (PAS) 130.

Dynamic Ad API (DAAPI) 105 is an example of a master API 20, as illustrated in FIG. 1, and serves as a central interface through which various microservices, broadcast systems, management systems, disaster recovery systems, obtain information needed to provide media content and advertising content customized for transmission by individual media stations. As noted above, Cloud-based playout control system 235 obtains broadcast and schedule information, including logs, spots, media items, changes to logs, affidavits, and the like, from DAAPI 105. DAAPI 105 also provides some or all of the broadcast and schedule information, either directly or indirectly, to local broadcast systems 185 and other subsystems of media management system 425.

For example, spot schedule information module 110 transmits a spot information request 280 to programmatic ad system (PAS) 130. The spot information request 280 includes information about spots (positions in a log) that PAS 130 is scheduled fill with advertisement items. In response to spot information request 280, PAS 130 provides a spot information response 255 indicating which spots (media items) PAS 130 has selected to fill the spots (log positions), and an address indicating a location of the media items in DAAPI database 125. In some embodiments, PAS system 130 transfers, e.g., in media item transfer message 345, the media item to DAAPI database 125 for storage. In other embodiments, the media item may have been previously stored in DAAPI database 125 from another source. When local broadcast systems 185 need to obtain spots provided by PAS 130, they can obtain the spots by requesting them from DAAPI 105, and direct communication between local broadcast systems 185 and a processing system implementing PAS 130 is not necessary.

DAAPI 105 can provide spot schedules 305 to log manager 150, which provides spot break information 310 to traffic/billing system 205 based on the spot schedules 305. In various embodiments log manager 150 provides completed or partial logs to DAAPI 105 for storage and later transmission to other microservice applications, local broadcast systems, and Cloud-based playout control system 235. Completed logs can include one or more broadcast schedules with all slots, including slots for spots, primary content, liners, perishable content (e.g., traffic, weather, news) filled. Partial logs can include one or more blank unscheduled log positions to be filled with spots indicated by PAS 130, with primary content provided by media placement system (MPS) 145, or another media automation service or subsystem. Particular logs are generally associated with one or more media stations, markets, users, or devices.

DAAPI 105 can also receive media items from media placement system (MPS) 145. For example, DAAPI 105 can transmit a media information request 300 to MPS 145. Media information request 300 includes information about positions in a log MPS 145 has been assigned to fill. Media information request 300 can include, but is not limited to, a request for a uniform resource locator (URL) or other information indicating a location from which one or more media items can be obtained, scheduled start and end times for broadcast of the one or more media items, media file identifiers, or the like.

In response to media information request 300, MPS 145 can generate a media placement response 340 in which the one or more media items are transferred to DAAPI database 125 for storage, and later retrieval by other microservice applications or local broadcast systems 185. In other embodiments, the one or more media items may have been previously stored in DAAPI database 125 from another source. When local broadcast systems 185 need to media items provided by MPS 145, they can obtain the media items by requesting them from DAAPI 105, and direct communication between local broadcast systems 185 and a processing system implementing MPS 145 is not necessary.

Programmatic advertisement system (PAS) 130 can implement a microservice providing programmatic insertion of advertisements into one or more media broadcasts. In particular, PAS 130 can be used to provide "bulk advertisements" to be inserted into local broadcasts. In some embodiments, for example, national and local advertisements are used to fill up as much available spot inventory on a media station as practical. Often, programmatic advertising is sold with no guarantee of exact timing of when programmatic advertisements will be aired. Thus, programmatic advertisements are often inserted into unscheduled spots without much advance notice. For example, in some embodiments traffic/billing system 205 is used to identify advertisements to be inserted into most available spots, but where there is unsold inventory, PAS 130 can be permitted to choose which advertisements are to be inserted into the unsold, schedule positions.

Log manager 150 provides information to traffic/billing system 205 to allow traffic and billing system 205 to generate broadcast logs for local broadcast systems 185. Log manager 150 also provides logs to DAAPI 105.

Media placement system (MPS) 145 is an automation import manager that places media items into automation systems associated with local broadcast systems 185. The media provided by MPS 145 can include, but is not limited to, traffic, weather, and new information. However, rather than placing the media items directly into local broadcast systems 185. MPS 145 transmits the media items to DAAPI 105 for storage, and later retrieval by local broadcast systems 185, e.g., via an edge device 50.

Traffic/billing system 205 is a processing system configured to control traffic and billing functions such as editing orders and scheduling spots. Traffic/billing system 205 receives spot break information 310 from log manager 150, syndicated content address and spot information 290 from integrated services layer (ISL) 170, and metadata and asset ID information 365 from Enterprise Copy module 220.

Syndicated content address and spot information 290 is transmitted by syndicated content service 180 to inventory management hub 175, which forwards spot information 290 to ISL 170 via message queue 240. The syndicated content address and spot information 290 can include a uniform resource locator (URL) specifying a location in media vault database 195 from which the syndicated content can be obtained, as well as spot information. The spot information can include targeting information associated with the syndicated content, where the targeting information can be used by traffic/billing system 205 to select appropriate media spots to be scheduled for broadcast in any unfilled spots associated with the syndicated content.

Traffic/billing system 205 provides metadata and asset ID information 365 received from Enterprise Copy module 220 to local broadcast systems 185. In some embodiments, the metadata and asset ID information 365 allows local broadcast systems 185 to obtain media items for broadcast from media vault 190, either directly or through an edge device 50 (FIG. 1), when local broadcast systems 185 are unable to access DAAPI 105. In some embodiments, local broadcast systems 185 obtain media items from storage in DAAPI database 125.

In various embodiments, inventory management hub 175, retrieves syndicated content media items from syndicated content service using the URLs included in syndicated content address and spot information, and transmits the syndicated content media items to media vault 190 for storage in MV database 195. In response to receiving the syndicated content media items, media vault 190 generates an asset ID 420, and stores the asset ID 420. In at least one embodiment, at the time an object, e.g., a syndicated content media item or some other media item, is requested from MV database 195, dynamic database 200 locates that object within MV database 195, allowing media vault 190 to respond to the request by providing the requested media item.

In addition to storing syndicated content media items, MV database 195 can also store creatives and other media items generated by various media editors, such as media editor 230. In some such embodiments, media editor 230 generates and uploads creative media and associated metadata 410 to paperless production workflow system (PPO) 225. The creative media and associated metadata 410 is then transmitted from PPO 225 to enterprise copy module 220, which uploads creative media and associated metadata 410 to media vault 190.

In some cases, the creative media is newly generated, while in other cases the creative media is an edited version of another media item obtained from media vault 190. Where the creative media is an edited version of another media, enterprise copy module 220 obtains the asset ID 400 of a media item to be edited, and transmits the asset ID to PPO 225. PPO 225 uses the asset ID 400 to obtain the media item to be edited, and transmits the media item to be edited to media editor 230.

Media vault 190 serves as a central repository for some or all previously broadcast media items, some or all media items currently scheduled for broadcast, and at least some media items anticipated to be used by media management system 425. Thus, in at least some embodiments, the number of media items stored in media vault 190 far exceeds the number of media items currently scheduled for broadcast. In various embodiments, media vault 190 transmits currently scheduled media items 415 to DAAPI database 125, which stores the currently scheduled media items for retrieval by local broadcast systems 185, and Cloud-based playout control system 235. While some such embodiments incur a storage penalty by maintaining more than one copy of media items, allowing local broadcast systems 185 to obtain the media items via DAAPI 105 can provide an improvement in delivery performance, because DAAPI 105 can retrieve only needed media items in advance, which limits the time needed to search for and deliver media items to the local broadcast systems 185.

Dynamic Ad API (DAAPI) also includes change notification module 120, which can be used to assist Cloud-based playout control system 235 in maintaining necessary media items and system states that will be needed when recovering from a failure. Additionally, the change notifications can be used to generate the affidavits provided to log manager 150, MPS 145, and PAS 130. Consider, for example, a case where one of the local broadcast systems 185 fails to stream, transmit, or otherwise broadcasts a media item included in its broadcast log. The local broadcast system can notify change notification module 120 of the discrepancy.

Change notification module 120 DAAPI can pass the information to affidavits module/API 245, which generates an affidavit that can be sent to log manager 150, MPS 145, and/or PAS 130, which can each take appropriate action. By way of example, and without limitation, log manager 150 may add the missed spot to a pool of items having a high priority for being re-selected. Media placement system (MPS) 145 can re-submit the media item for inclusion in another available spot. Programmatic ad system (PAS) can update remove the skipped spot from one or more reports with or without attempting to reinsert the advertisement.

Figure 3:
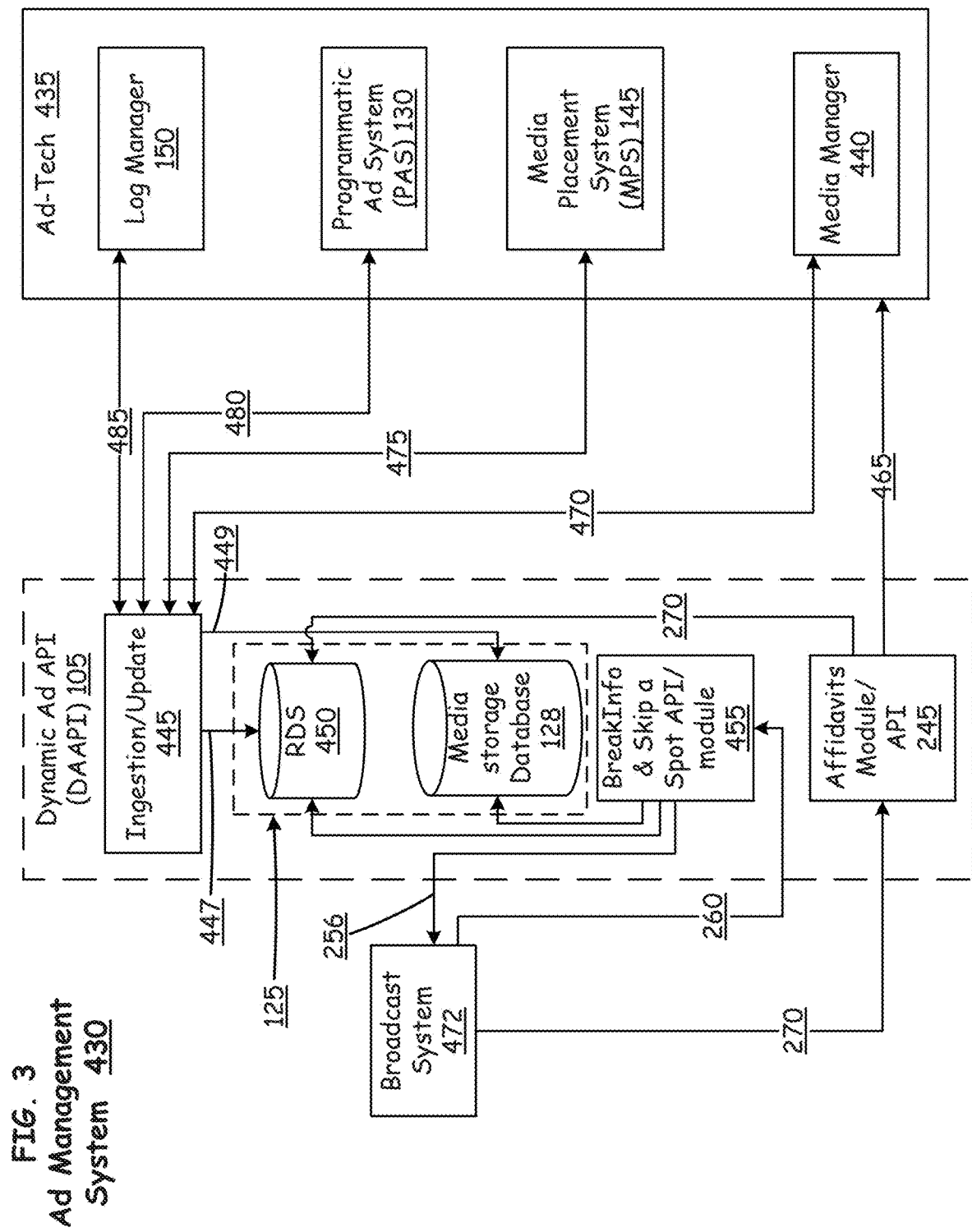
FIG. 3 is a schematic block diagram of an advertisement management system in accordance with embodiments of the present disclosure.

Referring next to FIG. 3, an ad management system 430 will be discussed in accordance with embodiments of the present disclosure. Ad management system 430 includes Ad-Tech system 435, Dynamic Ad API (DAAPI) 105, and broadcast system 472.

Ad-Tech system 435 can be implemented on one or more processors, each of which can be programmed to provide one or more of the following modules that provide advertisement automation micro-services: log manager 150, programmatic ad System (PAS) 130, media placement system (MPS) 145, and media manager 440. Ad-tech system 435 provides advertisement automation services to broadcast system 472 via DAAPI 105. The advertisement automation micro-services are also referred to herein as "traffic and continuity application."

Log manager 150, programmatic ad System (PAS) 130, media placement system (MPS) 145, each function generally as described with respect to FIG. 2. For example, log manager 150 transmits traffic logs and associated metadata 485 to DAAPI 105. Examples of metadata provided by log manager 150 include title information, system identifiers, genre, style, tempo, length, date recorded, artist information, industry identifiers, source information, and the like. PAS 130, transmits and/or receives spot information and media items 480 to DAAPI 105.

MPS 145 transmits and/or receives media information and media items 475 to DAAPI 105. Examples of media information provided by MPS 145 can include customer information, customer schedule information, media items, and media item metadata. The media items can include spots (advertisements) and/or primary content. Customer information can include, but is not limited to, customer identifiers and affiliate names. Customer schedule information can include, but is not limited to, customer identifiers, airtime, record time, length report name, delivery method, service type, market, and a Sponsored indicator, which includes information indicating whether a particular media item is sponsored.

In response to a request for a media item from DAAPI 105, MPS 145 can return information including a range of acceptable start times for the media item, a range of acceptable end times for the media item, a customer identifier, airtime, a copy identifier, a broadcast management system key, a traffic transmitter, a script, a service type, comments, a length of the media item, a prerecorded indicator, an advertiser identifier, an advertiser short name, makegood criteria, and/or the requested media item itself.

Media manager 440 provides media items 470 to DAAPI 105. DAAPI 105 can determine whether items scheduled for broadcast with a particular period of time are available from DAAPI Database 125. DAAPI 105 transmits, to media manager 440, a request for scheduled media items that are not currently available in DAAPI Database 125. Media manager 440 returns the requested media items, along with metadata associated with those media items. In some embodiments, media manager 440 is part of media Vault 190, as illustrated in FIG. 2. In other embodiments, media manager 440 is implemented as an interface between DAAPI 105 and media vault 190.

Each of log manager 150, PAS 130, MPS 145, and media manager 440 also receive one or more affidavit messages 465 from DAAPI 105.

Dynamic Ad API (DAAPI) 105 includes ingestion/update module 445; DAAPI Database 125, which includes relational database service (RDS) 450 and media storage database 128; BreakInfo and Skipped Spot API 455; and Affidavits module/API 245. DAAPI 105 receives information used for automated insertion of advertisements in over-the-air media broadcasts, streaming media broadcasts, podcasts, or the like, and provides that information to broadcast system 472. DAAPI 105 can obtain information necessary to cover a relatively long period of broadcasting, while still proving the ability to make last-minute changes to broadcast content.

For example, DAAPI 105 may receive 24 hours-worth of broadcast content from Ad-Tech 435, and store that content, and then stream or otherwise transmit a fully assembled broadcast to broadcast system 472 for over-the-air or streaming broadcast to end-users. As use herein, the term "fully formed broadcast" refers to one or more files that include all, or substantially all, media items to be broadcast, i.e., primary content, spots (advertisements), and tertiary content, with the possible exception of station identifiers, liners, sweepers, or the like. A fully formed broadcast will be arranged to allow sequential playout of media items in accordance with a broadcast log. Note that in some embodiments, fully assembled broadcast logs are generated by broadcast system 472, and DAAPI 105 simply provides broadcast logs and content needed for broadcast system 472 to generate the fully assembled broadcast logs. DAAPI 105 also serves as a coordinator, and as its name implies, an interface, between Ad-Tech 435 and broadcast system 472.

Assume, for example, that twenty-four hours in advance of a broadcast, DAAPI 105 transmits a log and a fully assembled broadcast based on that log to multiple broadcast systems. Further assume that 2 hours before the fully assembled broadcast is scheduled to air, one of those broadcast systems, e.g., broadcast system 472 sends a request to DAAPI 105 indicating that a new advertisement is to be inserted in place of a scheduled advertisement already included in the fully formed broadcast. In this example, broadcast system 472 can notify DAAPI 105 of the requested change. DAAPI 105 can obtain an updated broadcast log and the new advertisement from Ad-Tech 435, and generate a new broadcast to transmit to broadcast system 472 without having to rely on broadcast system 472 to make the changes to the log, and without having to retransmit any extra data to the other broadcast systems. This allows ad management system to provide improved performance relative to conventional systems, first by allowing last minute changes to a broadcast, and second by minimizing the amount of data that needs to be transmitted to accommodate those last minute changes. Other improvements to existing automated scheduling systems, which include ad management systems, will also be apparent upon consideration of the present disclosure.

Ingestion/update module 445 is the portion of DAAPI 105 that receives traffic logs and associated metadata 485 from log manager 150, spot information and media items 480 from PAS 130, media information and media items 475 from MPS 145, and media items 470 from media manager 440. In various embodiments, ingestion/update module 445 requests traffic logs from log manager 150. In other embodiments, log manager 150 transmits a notification to ingestion update module 445 when original or updated logs are ready to be retrieved. So, for example, if log manager 150 generates an updated log in response to information in an affidavit indicating that an originally scheduled spot has been skipped or replaced, log manager 150 can modify a future log to add the originally scheduled spot into an upcoming broadcast.

Ingestion/update module 445 processes and routes the information received from log manager 150, PAS 130, from MPS 145, and media manager 440 for storage and later delivery to a disaster recovery service 40 (FIG. 1), such as Cloud-based playout control system 235 (FIG. 2), and/or broadcast system 472. In some embodiments, ingestion/update module 445 can also transmit requests for updated media and/or logs based on requests received from broadcast system 472.

In at least one embodiment, ingestion/update module 445 divides received data into log-related information 447 and media data 449. Log-related information can include spot (advertisement) identifiers, metadata, broadcast logs, log metadata, broadcast system identifiers, information used to link the log-related information to particular media data 449, and the like. Media data 449 can include actual media files, information used to link the media files to the appropriate log-related information, and media-item metadata.

In some such embodiments, ingestion/update module 445 routes log-related information 447 to relational database service (RDS) 450 for storage, while routing media items to media storage database 128. Either or both of database service 450 and media storage database 128 can be implemented using stand-alone storage devices local to the same processing device used to implement ingestion/update module 445, using dedicated machines connected to ingestion/update module 445 via a communications network, or as cloud-based services accessible to ingestion/update module 445.

BreakInfo and Skipped Spot API 455 provides break information 256 to broadcast system 472, and receives skipped-spot information 260 from broadcast system 472. In at least one embodiment, BreakInfo and Skipped Spot API 455 provides the interface between broadcast system 472 and both spot schedule information module 110 (FIG. 2) and change notification module 120 (FIG. 2). In some embodiments, spot schedule information module 110 and change notification module 120 are implemented as a single module that uses BreakInfo and Skipped Spot API 455 as its interface. In response to receiving skipped-spot information 260, BreakInfo and Skipped Spot API 455 transmits skipped-spot information 260 to RDS 450, which stores the information as log-related information, or uses the information to update previously stored log-related information associated with the skipped spot (slot or position in the log). BreakInfo and Skipped Spot API 455 also transmits skipped-spot information 260 to media storage database 128, which can store the information in conjunction with a stored media item, or update media metadata associated with the skipped spot (media item).

Affidavits module/API 245 receives affidavits 270 (sometimes referred to herein as playout affidavits) posted by broadcast system 472, and transmits those affidavits to Ad-Tech 435 for delivery to one or more of the traffic and billing continuity applications, or microservices, included in Ad-Tech 435. Additionally, affidavits module/API 245 transmits the affidavits for storage by RDS 450. In various embodiments, ingestion/update module 445 can use the affidavits when deciding to request updated media items and/or logs from Ad-Tech 435.

Broadcast system 472 is, in at least one embodiment, one of the local broadcast systems 185, as illustrated in FIG. 2, which serves one or more streaming media stations, such as streaming media station 70 (FIG. 1), one or more media broadcast stations 95 (FIG. 1) or some combination thereof. In some embodiment, broadcast system 472 can be implemented in an edge device 50. Note that broadcast system 472 can be controlled by Cloud-Based Playout Control 235.

Figure 4:
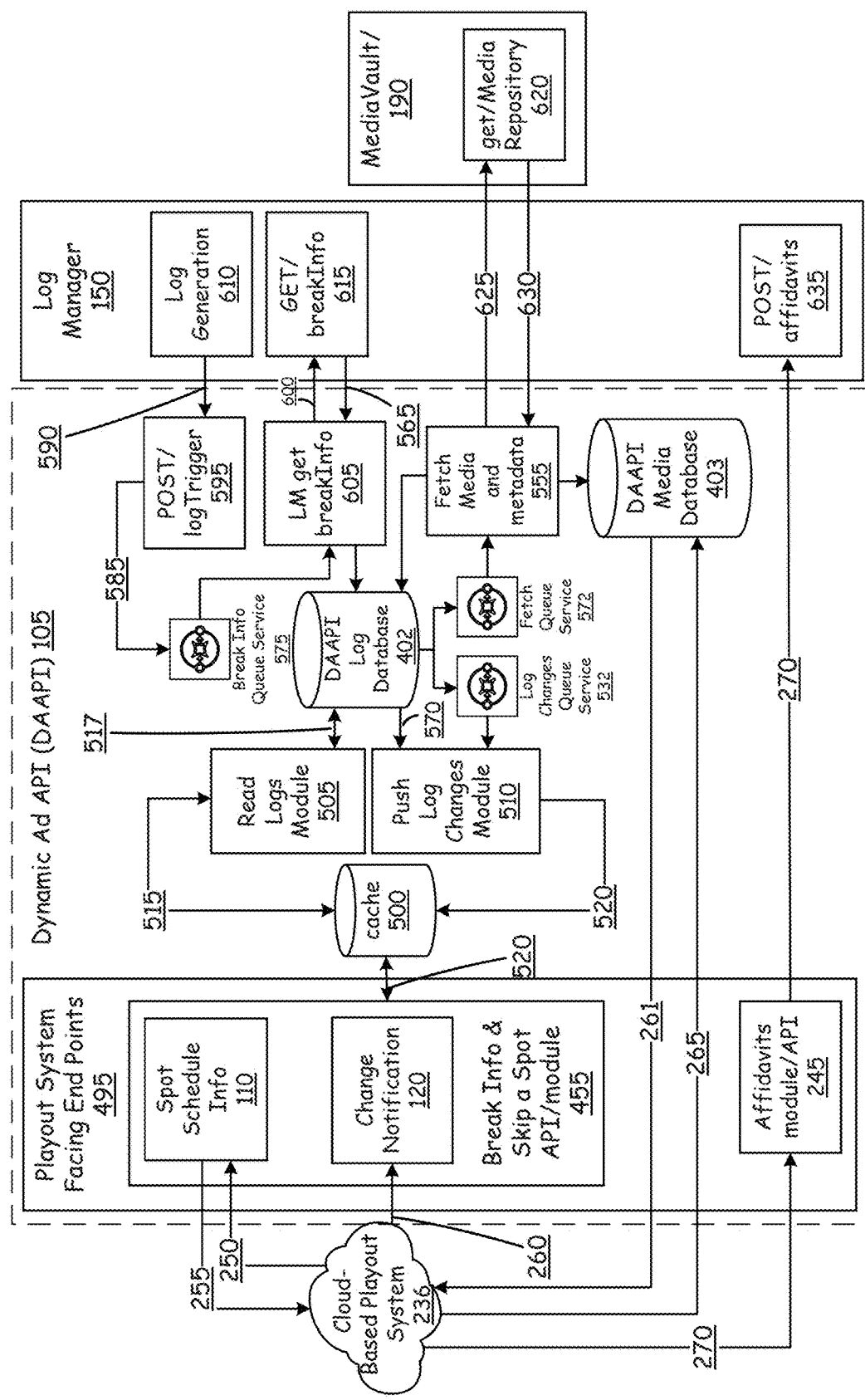
FIG. 4 is a schematic block diagram of a log management system in accordance with embodiments of the present disclosure.

Referring next to FIG. 4 a log management system 490 will be discussed in accordance with various embodiments of the present disclosure. Log management system 490 includes Dynamic Ad API (DAAPI) 105; cloud-based playout system 236, which is a cloud-based implementation of broadcast system 472; log manager 150, which includes log generation module 610, get/break info interface 615, and post/affidavits module 635; and media vault 190, which includes media repository 620. Cloud-based playout system 236 can include some or all components of cloud-based playout control 235 (FIG. 2), broadcast system 472 (FIG. 3) or both.

The illustrated embodiment of Dynamic Ad API (DAAPI) 105 includes playout-system-facing endpoints 495, including break info and skip a spot API 455 (FIG. 3) and affidavits module/API 245. Break info and skip a spot API 455 includes spot schedule information module 110 and change notification module 120. DAAPI 105 also includes cache 500; DAAPI log database 402, which is an example of RDS database 450 (FIG. 3) and is used to store broadcast logs and log-related information and metadata obtained from log manager 150; read logs module 505; push log changes module 510; break info queue service 575; log changes queue service 532; fetch queue service 572; post/log trigger module 595; LM get break info module 605; fetch audio and metadata module 555; and DAAPI media database 403, which is an example of media storage database 128 (FIG. 3), and is used to store media items obtained from media vault 190, along with metadata associated with the media items.

Spot schedule information module 110 provides cloud-based playout control system 236 with information about spots to be broadcast and/or streamed. for example, spot schedule information module receives a spot information request 250 from cloud-based playout control system 235, and returns a spot information response 255. Spot information request 250 includes a request for break information, and spot information response 255 includes the requested break information. Break information can include spot break information about log positions and media items used to fill those log positions. For example, break information can include information indicating an address, e.g., a uniform resource locator (URL), at which a media item referenced in a broadcast log can be retrieved, all or a portion of a broadcast log associated with the media item, information identifying a local broadcast system to which the break information pertains, or the like.

Change notification module 120 obtains skipped-spot information 260 from cloud-based playout control system 235. Skipped-spot information 260 includes information indicating discrepancies between media items (spots) scheduled for broadcast according to a broadcast log, and media items actually broadcast. Skipped-spot information can include, but is not limited to, spot identifiers of fully or partially skipped spots, scheduled broadcast station and time, an indicator specifying whether a spot was fully skipped or partially skipped, or the like. Skipped spot information 260 can be used by DAAPI 150 to determine whether a future log may need to be updated to include the skipped media item, to update the metadata of stored media items and/or broadcast logs to reflect the fact that the media item has not been fully broadcast, to provide billing and/or tracking systems information needed to accurately reflect fulfillment of campaign requirements, or the like.

Affidavits module/API 245 receives affidavits 270 from cloud-based playout system 236, and transmits the affidavits to Post/affidavits module 635, which is included in log manger 150. Affidavits 270, like skipped spot information, includes information indicating discrepancies between media items (spots) scheduled for broadcast according to a broadcast log, and media items actually broadcast. Unlike skipped spot information, however, affidavits 270 can also include playout information indicating that there are no discrepancies between scheduled and actually played-out media items. Information included in the affidavits can be used by log manager 150 in constructing or adjusting future broadcast logs to include the skipped media item.

Cache 500 exchanges log-related information 520 with break info and skip a spot API 455. Log-related information 520 can include, broadcast logs, break information, spot break information, or the like. For example, spot schedule information module 110 can receive a request for break information associated with a particular media station from cloud based playout system 236. In response to the request for break information, spot schedule information module 110 can transmit a log request via path 515 to read logs module 505. Read logs module 505 obtains the requested log, via path 517, from DAAPI log database 402, and transmits the requested log to cache 500 via path 515. Cache 500 caches the requested log for subsequent transmission to spot schedule information module 110 as log-related information 520.

There may be cases where a log previously provided to cloud-based playout system 236 is changed by log manager 150. In some embodiments, push log changes module 510 retrieves the changed log, or in some cases the log changes, from DAAPI log database 402 via path 570. In at least some implementations, push log changes module 510 pushes the changed log and/or the log changes to cache 500, without waiting for a log request. Cache 500 caches the changed log and/or the log changes for later transmission to spot schedule information module 110 as log-related information 520.

DAAPI log database 402 can transmit the changed log and/or the log changes to cache 500 via log changes queue service 532. In some cases, log changes queue service 532 is not a receipt ordered queue, such as a first-in-first-out (FIFO) queue or a last-in-first-out (LIFO) queue. Instead, log changes queue service 532 can transmit changed log and/or the log changes based on a priority of each item in the queue, based on a "hold time" associated with each item, based on a station identifier or station status indicator associated with each item, or on some other basis. In some implementations, log changes queue service 532 can hold an item in queue for a given period of time, and if another change impacting the held item is received before the given period of time elapses, the older of the two items can be deleted from the queue before being delivered to push log changes module 510.

Post/log trigger module 595 provides a trigger notification 585 to break information queue service 575, which queues the notification for delivery to log manager (LM) get break information module 605. Trigger notification 585, triggers LM get break information module 605 to send a get break info request 600 to get/break information interface 615, which is part of log manager 150. Get/break information module can respond by transmitting requested break information 565, which can include complete logs, partial logs, log metadata or like, to LM get break information module 605. LM get break information module 605 transmits break requested break information 565 to DAAPI log database 402 for storage and later delivery to cloud-based playout system 236 via break info and skip a spot API 455.

In response to receiving requested break information 565, DAAPI log database 402 stores the requested break information 565, transmits log changes included in the break information to log changes queue service 532, and transmits fetch information to fetch queue service 572. The fetch information provides information allowing media items identified in the requested break information to be obtained from media vault 190. The fetch information can include, but is not limited to, media identifiers, address information identifying a location from which media items can be obtained, a creative identifier that uniquely identifies the media item to be fetched, or the like. Fetch queue service 572 transmits the fetch information to fetch media and metadata module 555.

In response to receiving the fetch information from fetch queue service 572, fetch media and metadata module 555 transmits a fetch request 625, which includes the fetch information, to get/media repository 620, which is included in media vault 190. Get/media repository 620 returns a fetch response 630. Fetch response 630 can include the media item, metadata associated with the media item, an address of the media item if it is already stored within DAAPI media database 403, or some combination thereof, and receives a fetch response. In response to receiving fetch response 630, fetch media and metadata module 555 transmits the media item, and optionally the media metadata, to DAAPI media database 403 for storage and later transmission to cloud-based playout system 236. In conjunction with transmitting the media item to DAAPI media database 403, fetch media and metadata module 555 transmits media metadata and an address at which the media has been stored to DAAPI log database 402.

Considering the following example. Log manager 150 transmits a log that is retrieved by LM get break info 605, and stored in DAAPI log database 402. Fetch media and metadata module 555 retrieves the media specified in the log, and stores that media at a particular location in DAAPI media database 403. In that case, fetch media and metadata module 555 will send an address, for example a URL specifying the address at which the media has been stored in DAAPI media database 403, to be stored in DAAPI log database 402. The URL will be stored as log metadata, and associated with the log that specifies the media. In that way, when the log associated with the media item is later provided to cloud-based playout system 236, cloud-based playout system 236 knows the address of the media, and can include that address of the media in download request 265, which is sent to DAAPI media database 403. In response to receiving download request 265, DAAPI media database 403 can return the requested media item to cloud-based playout system 236 in a download response 261.

Log manager 150 include log generation module 610, which generates new broadcast logs, and/or updates existing broadcast logs. The new broadcast logs can be generated using input from various media automation and/or traffic and billing systems, including without limitation Viero, Aquira, GSelector, or the like. Log generation module 610 can also use affidavits 270 received at post/affidavits module 635 from cloud-based playout system 236 to identify some items to be inserted into new or updated broadcast logs. In some embodiments, log manager 150 can also use inputs from other traffic and continuity applications to assist in generating logs and break information.

Figure 5:
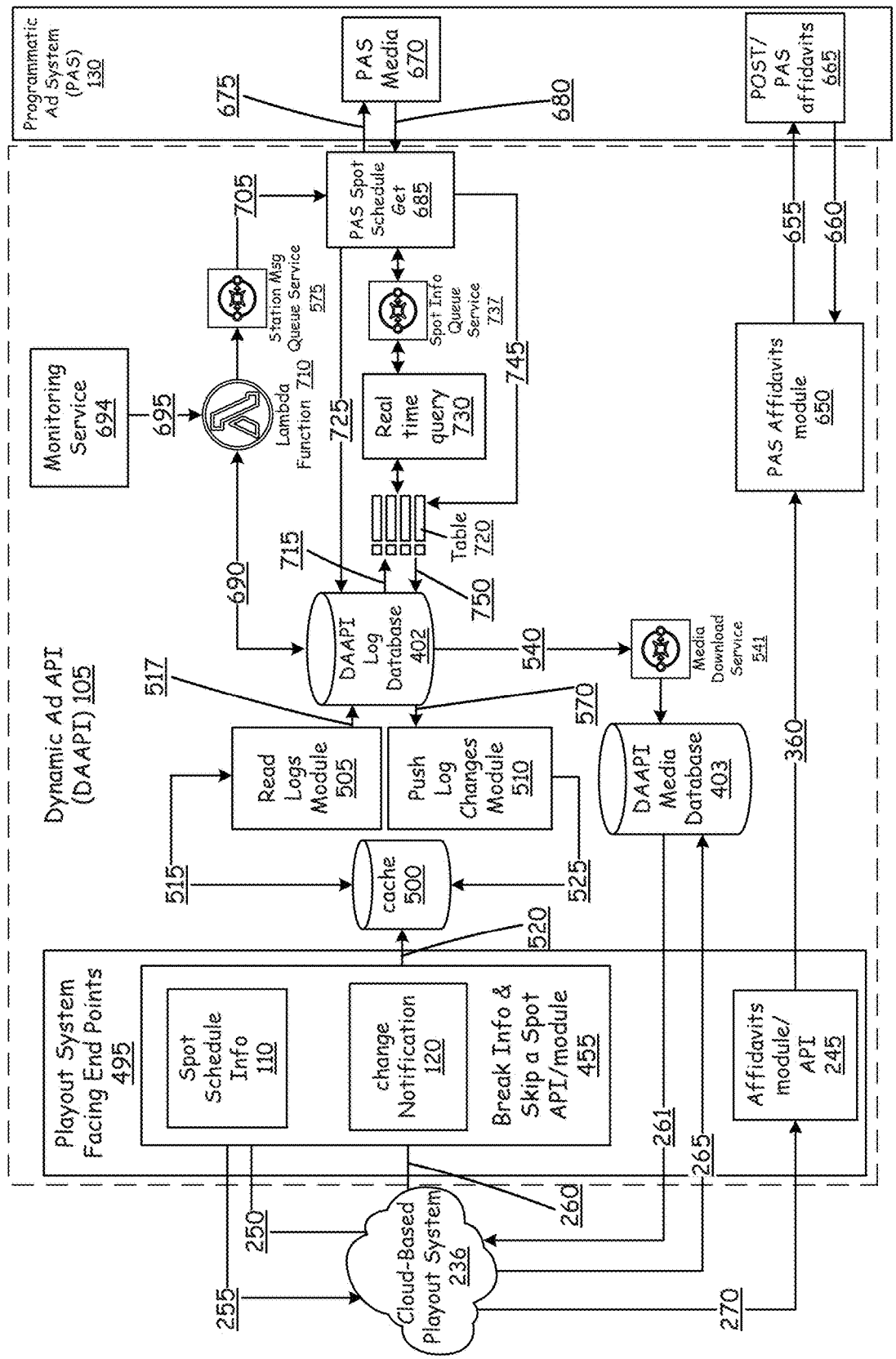
FIG. 5 is a schematic block diagram of a programmatic advertisement insertion system in accordance with embodiments of the present disclosure

Referring next to FIG. 5 a programmatic advertisement insertion system 545 will be discussed in accordance with embodiments of the present disclosure. Programmatic advertisement insertion system 545 includes Dynamic Ad API (DAAPI) 105; cloud-based playout system 236; and programmatic ad system (PAS) 130, which includes PAS media storage 670 and Post PAS affidavits module 665.

The illustrated embodiment of Dynamic Ad API (DAAPI) 105 includes playout-system-facing endpoints 495, including break info and skip a spot API 455 and affidavits module/API 245. Break info and skip a spot API 455 includes spot schedule information module 110 and change notification module 120. DAAPI 105 also includes cache 500; DAAPI log database 402, which is used to store broadcast logs and log-related information metadata obtained from log manager 150; read logs module 505; push log changes module 510; DAAPI media database 403, which is used to store media items obtained from PAS 130, along with metadata associated with the media items. Each of these elements functions in a way substantially similar to those same elements, as discussed with respect to FIG. 4.

The illustrated embodiment of Dynamic Ad API (DAAPI) 105 also includes media download service 541, monitoring service 694, lambda function 710 station message queue service 575, Programmatic Ad system (PAS) spot schedule get module 685, spot information queue service 737, real time query module 730, comparison table 720, and PAS affidavits module 650.

PAS 130, provides advertisements for insertion into spots (log positions) reserved for programmatic ad insertion by log generation module 610 (FIG. 4). At the time the broadcast log is generated, the log manager 150 (FIG. 4) does not know which specific spots (advertisements) are to be inserted into the log positions reserved for programmatic ad insertion. Likewise, PAS 130 does not know which log positions the log manager 150 has reserved for PAS 130 to use. Consequently, PAS spot schedule get module 685 transmits a request for PAS media items 675 to PAS media storage 670. The request for PAS media items 675 can specify information about log positions available for insertion of programmatic advertisements. For example, request for PAS media items 675 can specify a start time of an available spot (log position), an end time of an available spot, metadata associated with the available spot, media content surrounding the available spot, a full; or partial broadcast log, and/or other information that PAS 130 can use to select programmatic ads for insertion into the available spot.

In response to receiving the request for PAS media items 675, PAS media storage 670 returns a PAS response 680 to PAS spot schedule get module 685. The PAS response 680 can include, but is not limited to, spot information including a URL or other address specifying a location from which a PAS media item can be obtained, a start time specifying when the PAS expects the PAS media item to broadcast, a duration of the PAS media item, metadata associated with the PAS media item, a unique system identifier that can be used to identify the PAS media item, or the like.

PAS spot schedule get module 685 transmits PAS spot information message 725 to DAAPI log database for storage. PAS spot information message 725 includes PAS spot information, which can include all of the information included in PAS response 680, including the address of the PAS media item. In some embodiments, the PAS spot information may include a limited subset of the information included in PAS response 680.

DAAPI log database 402 associates the address of the PAS media item with the appropriate spot (log position) in the appropriate log, and stores the association, along with information included in the PAS spot information message 725, as log metadata, or as an element of a broadcast log associated with the PAS media item. In at least one embodiment DAAPI log database 402 can flag a particular broadcast log position as "filled" in response to receipt of a PAS spot to be inserted into that particular broadcast log position.

DAAPI log database 402 transmits download information 540, including the addresses specifying locations from which PAS media item can be obtained, e.g., URLs associated with PAS media items, to media download service 541.

Media download service 541 uses download information 540 to obtain the PAS media items, and transmits the PAS media items to DAAPI media database 403 for storage, and later retrieval by cloud-based playout system 236

A comparison between the information provided by PAS media storage 670 and information already stored in DAAPI log database 402 can be triggered in response to receipt of PAS spot information message 725. In some embodiments, the comparison can be triggered in response to DAAPI log database 402 determining that PAS spot information message 725 includes information about previously filled log positions. The determination about whether a particular log position has been previously filled can be made based on a "filled" flag, or based on a check of stored association metadata.

In some such embodiments, trigger 715 initiates formation of table 720, which includes a time ordered list of PAS media items and metadata previously associated with the log position indicated in PAS spot information message 725. For example, assume that PAS spot information message 725 includes metadata and addresses of PAS media items to be broadcast between 2:05:15 am and 2:08:30 am on Station A the following day. In this example, table 720 will be populated with information related to PAS media items that have already been associated with spots (log positions) in Station A's broadcast log between 2:05:15 am and 2:08:30 am the next. If PAS media items have been associated with those spots (log positions), table 720 can be populated with information about those PAS media items. If there no PAS media items associated with those spots (log positions), table 720 can be empty. In some embodiments, rather than populating an empty table 720 an empty table need not be generated.

A comparison 745 can be made between the contents of table 720 and the content of PAS spot information message 725 to determine if any changes to previously stored log-related information needs to be made. Comparison 745 can be made by using real-time query module 730, and spot information queue service 737 to extract comparison information from PAS response 680 received by PAS spot schedule get module 685. In other embodiments, real-time query module 730, and spot information queue service 737 can be used to populate table 720, and log-related information from DAAPI log database 402 can be compared to the contents of table 720. Alternatively, two tables can be generated and compared.

Regardless of which data is used to populate table 720, if comparison 745 indicates differences between log-related information stored in DAAPI log database 402 and spot information included in PAS spot information message 725, update notification 750 can be delivered to DAAPI log database 402. In response to receiving update notification 750, DAAPI log database 402 updates its stored log-related information, updates the download information 540, and transmits download information 540 to media download service 541.

In some embodiments, monitoring service 694 continually monitors communications between media stations served by cloud-based playout system 236 to identify the occurrence of an event indicating that a media station is approaching a time when broadcasting of programmatic advertisements is to begin. In response to detecting such an event, monitoring service 694 transmits an event notification 695 to lambda function 710, which obtains a list of media stations and/or log-related data 690 from DAAPI log database 402. Lambda function 710 transmits the list of media stations and/or log-related data 690 to station message queue service 575, which in turn passes the list of media stations and/or log-related data 690 to PAS spot schedule get module 685. In response to receiving the list of media stations and/or log-related data 690, PAS spot schedule get module 685 transmits the request for PAS media items 675 to PAS media storage 670.

Affidavits 270 are received at affidavits module/API 245, which is included in DAAPI 105. Affidavits 270 include PAS affidavits 360, to be delivered to PAS system 130. Affidavits module/API 245 transmits PAS affidavits 360 to PAS affidavits module 650, which delivers PAS affidavit post message 655 to POST/PAS affidavits module 665. POST/PAS affidavits module 665 responds to receipt of the In response to receipt of PAS affidavit post message 655 by transmitting a PAS affidavit response 660 back to PAS affidavits module 650.

The information included in PAS affidavits 360 includes, but is not limited to the following: a status code; a spot instance identifier; a uniform resource locator (URL), such as an aircheck URL indicating a location at which a record demonstrating actual playout of the media is stored, information included in PAS affidavit post message 655, or the like. The status code and associated spot instance identifier can be used to notify PAS system 130 about a playout status of a particular spot (media item) selected and/or provided by PAS system 130 for broadcast/streaming by cloud-based playout system 236.

PAS affidavit post message 655 can include, but is not limited to, a playout start time, a playout end time, an aircheck URL, one or more system identifiers associated with the media item, or the like. In some embodiments, the information included in PAS affidavits 360, PAS affidavit post message 655, and/or PAS affidavit response 660, can be stored in DAAPI log database 402.

Figure 6:
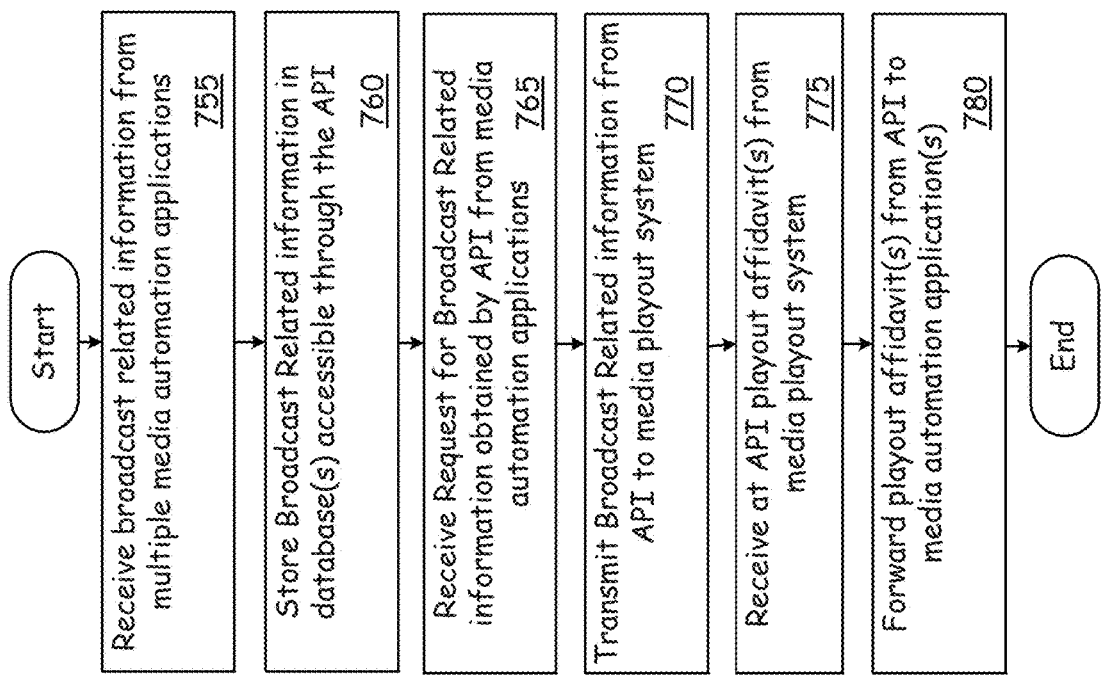
FIG. 6 is a flowchart illustrating a method of moving broadcast related information between a media playout system and multiple media automation applications in accordance with embodiments of the present disclosure.

Referring next to FIG. 6, a method of moving broadcast related information between a media playout system and multiple media automation applications will be discussed in accordance with embodiments of the present disclosure. As used herein, the term "broadcast related information" can include, without limitation, any or all of the following: spot information, media data, media information, log-related information, metadata, media items, logs, scheduling information, preferences, targeting information, station specific information, asset identifiers, addresses, or other information used in the broadcasting and scheduling process by media automation systems, broadcast disaster recovery systems, ad insertion systems, media management systems, playout systems, or services and modules used by those systems.

As illustrated by block 755, an application programming interface (API) included in a media broadcast system receives broadcast related information from multiple media automation applications. These applications can be implemented as microservice applications, each of which provides specific types of functionality used to generate logs, populate logs with media items, and provide those logs and media items to media stations for over-the-air or streaming broadcast. The API can receive the broadcast related information in response to a request for broadcast related information received from an edge device and/or a media playout system associated with one or more media stations.

As illustrated by block 760, the API stores the broadcast related information in one or more databases, for later transmission to requesting media playout systems, media broadcast systems serving local stations, disaster recovery systems, or the like. In various embodiments, the API stores current, recently past, and upcoming broadcast information for use by requesting systems and/or applications. For example, the API can store broadcast data that is expected to be used by broadcast stations within the next 24-48 hours, broadcast data currently being used by broadcast stations, and broadcast data for the previous 48 hours. Keeping a limited amount of broadcast data stored in the API's databases allows the API to quickly service requests for broadcast related information from requesting applications and/or systems.

In some embodiments, different databases are used to store different types of broadcast-related information, e.g., log-related information and media-related information. In other embodiments, broadcast-related information can be stored in a single database. The database, or databases, used to store the broadcast related information can be implemented using the same processing device(s) used to implement the API. In other implementations, one or more of the databases used to store the broadcast information can be implemented as a cloud-based data storage system.

As illustrated by block 765, the API receives requests for stored broadcast related information from one or more media automation applications, including media automation services applications, applications included in edge devices and media playout systems, and the like. By receiving and servicing requests for broadcast-related information obtained from media automation applications, the media automation applications can be isolated from the local media automation and/or media playout systems that use services provided by the media automation applications.

Additionally, using the API allows the media automation services to provide media broadcast information well in advance of the time the media broadcast information is provided to the local broadcast stations. In modern broadcasting systems, some broadcast information is relevant to multiple different media stations. If changes to widely distributed broadcast information is first broadcast to a large number of local media stations, any changes would also have to be provided to those local systems, requiring the local systems to have the capability of inserting the changes into previously provided broadcast logs, etc. In various embodiments described herein, changes to the broadcast information can be provided to the API before the information is transmitted to the local stations, thereby decreasing the amount of data that must be transmitted to accommodate changes in previously scheduled broadcasts, and decreasing the computing complexity needed by local broadcast systems to deal with changes in broadcast-related information.

As illustrated by block 770, in response to receiving the request, the API transmits the stored broadcast related information to the requesting media playout system. In various embodiments, the media playout system plays out media items by broadcasting them via a stream or an over-the air broadcast, and transmits to the API an affidavit, which includes information about the playout of the media items.

As illustrated by block 775, the API receives the affidavits from the playout systems. The affidavits include as-played information indicating a playout status of the media content. For example, an affidavit can include information indicating that a particular media item was fully played out on a particular media station, information indicating a start and/ or end time of playout of that particular media item, information indicating partial or skipped playout of a media item, status codes, spot instance identifiers, aircheck URLs, media address information, or the like.

As illustrated by block 780, playout affidavits received by the API are forwarded to appropriate media automation applications. The API can decide which media automation application is to receive a particular affidavit based on address information included in message headers used to transmit the affidavits, or based on the content of the affidavits. For example, an affidavit can include information specifying that a particular affidavit is to be forwarded to log manager 150, PAS 130, MPS 145, or media manager 440 (FIG. 3).

In some embodiments, a first affidavit can be sent to notify a media automation services/applications when playout of a media item has started, and a second affidavit can be sent to that same media automation service when playout of the media item has been completed. In various embodiments, the API transmits an affidavit generated by a first media automation application to a second media automation application.

Figure 7:
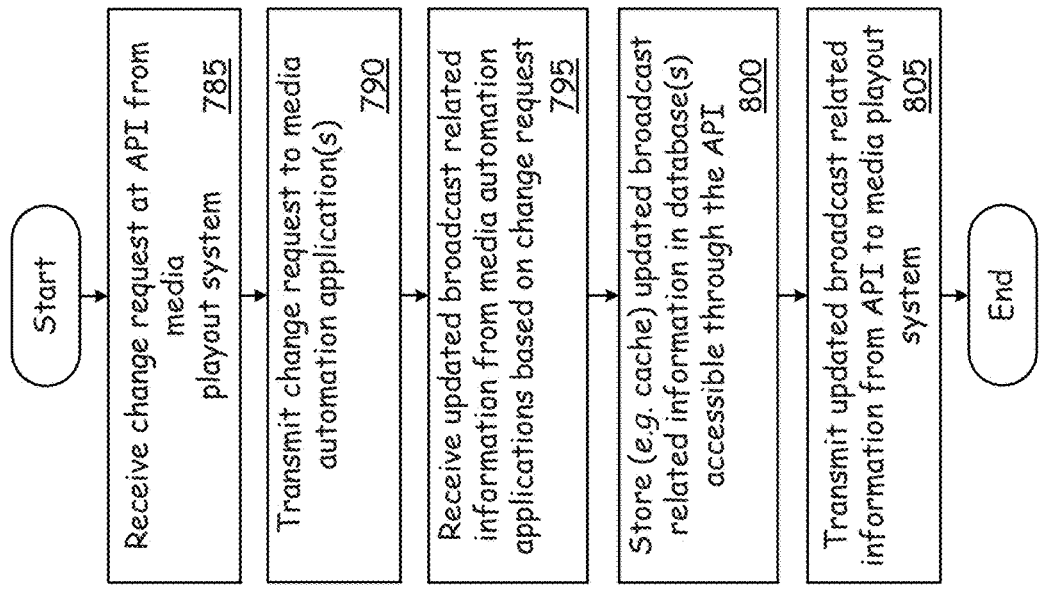
FIG. 7 is a flowchart illustrating a method of handling change requests in a media broadcast system in accordance with embodiments of the present disclosure.

Referring next to FIG. 7 a method of handling change requests in a media broadcast system will be discussed in accordance with embodiments of the present disclosure. As illustrated by block 785, an API, for example DAAPI 105, receives a change request from a media playout system, such as broadcast system 472 (FIG. 3), Cloud-based playout system 236 (FIGS. 4-5), or edge device/media playout system 50 (FIG. 1). The change request can indicate a requested change in one or more media items scheduled for broadcast/streaming by one or more media stations. The requested change include a request to substitute, add, or remove primary content, advertising content, and/or tertiary content.

As illustrated by block 790, the API transmits the change request to appropriate media automation application/service. For example, if the request is for modification of scheduled programmatic advertisement, the change request can be transmitted to PAS 130 (FIG. 3) and/or log manager 150. If the request is for a change to a news, weather or traffic media item, the change request can be delivered to MPS 145 (FIG. 3) and/or log manager 150. If the request is for a change to a primary content media item, the change request can be delivered to media manager 440 (FIG. 3) and/or log manager 150.

As illustrated by block 795, in response to providing the change request to one or more of the media automation applications/services, updated broadcast-related information is received from the appropriate media automation applications/services. As illustrated by block 800, the API stores the updated broadcast-related information in one or more databases, for example DAAPI database 125 (FIG. 3).

Either subsequent to, or concurrent with, storing the updated broadcast-related information, the API transmits the updated broadcast related information to the requesting media playout system, as illustrated by block 805. In various embodiments, if the change request is denied by one of the media automation applications/services, a notification can be sent to the requesting media playout system in place of the updated broadcast-related information. In other embodiments, failure to receive updated broadcast-related information at the requesting playout system will result in the requesting playout system playing out the media as originally scheduled.

Figure 8:
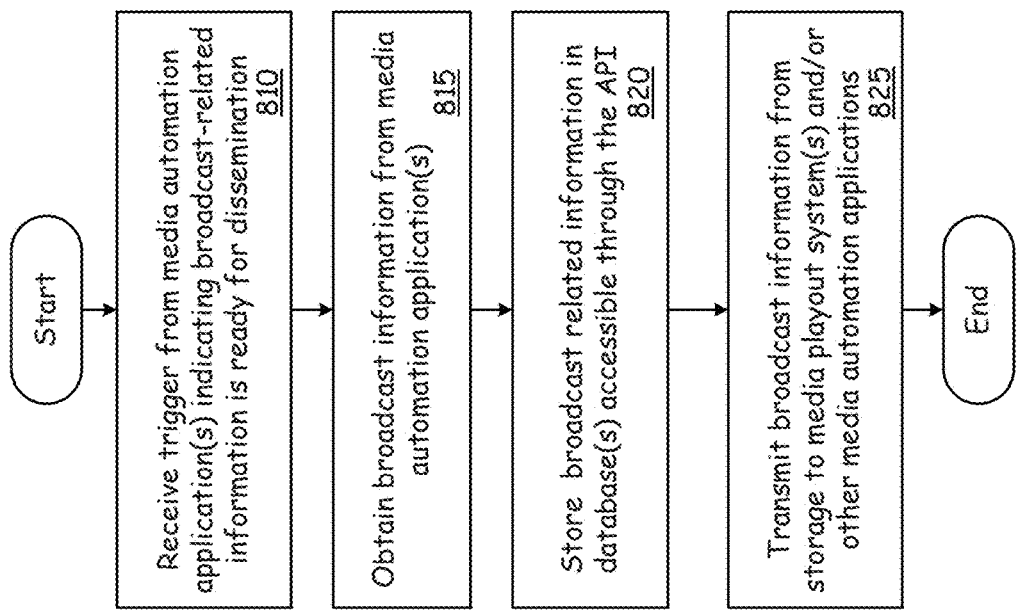
FIG. 8 is a flowchart illustrating a method of disseminating broadcast information in a media broadcast system in accordance with embodiments of the present disclosure.

Referring next to FIG. 8, a method of disseminating broadcast information in a media broadcast system will be discussed in accordance with embodiments of the present disclosure. As illustrated by block 810, an API receives a trigger message from one or more media automation applications. The trigger message indicates that broadcast-related information is ready for dissemination to playout systems and/or other media automation systems that provide media broadcast and/or streaming services associated with one or more media stations. In at least one embodiment, the trigger message is received from a log manager, and identifies at least one broadcast log ready for dissemination to one or more of the individual media stations. In various embodiments, the API can also receive trigger messages from media automation application/services other than the log manager, for example, if an updated weather report to be inserted into a particular broadcast log has not yet been generated, MPS 145 can transmit a trigger message once the weather report becomes available to MPS 145.

A trigger message can include an application/service identifier that identifies the media automation application/service that transmits the trigger message. Additionally, the trigger message can include a media item identifier, a log identifier, a station identifier indicating one or more media stations impacted by the trigger message, or the like. In various embodiments, however, a trigger message includes information instructing the API to request the media automation application/service to provide unspecified broadcast information from that automation application/service. For example, if a log manager application/service transmits a trigger message to the API, the trigger message may not include information about which log is ready to be disseminated, only that the API should transmit a request for broadcast information to the media automation application/service.

As illustrated by block 815, in response to receiving a trigger message from a media automation application/service, the API obtains the media item, log, or other broadcast-related information from the media automation application/service that transmitted the trigger message. Obtaining the broad-cast related information can include transmitting a request for the media automation application/service to transmit specific broadcast related information to the API, a request for the media automation application/service to transmit all broadcast-related information ready for dissemination, a request to provide only updates to previously transmitted broadcast information, or some combination thereof.

As illustrated by block 820, the API stores the broadcast-related information in a database. The API transmits the stored broadcast-related information to one or more media playout systems, edge devices, and/or other media automation applications/services, as illustrated by block 825.

Figure 9:
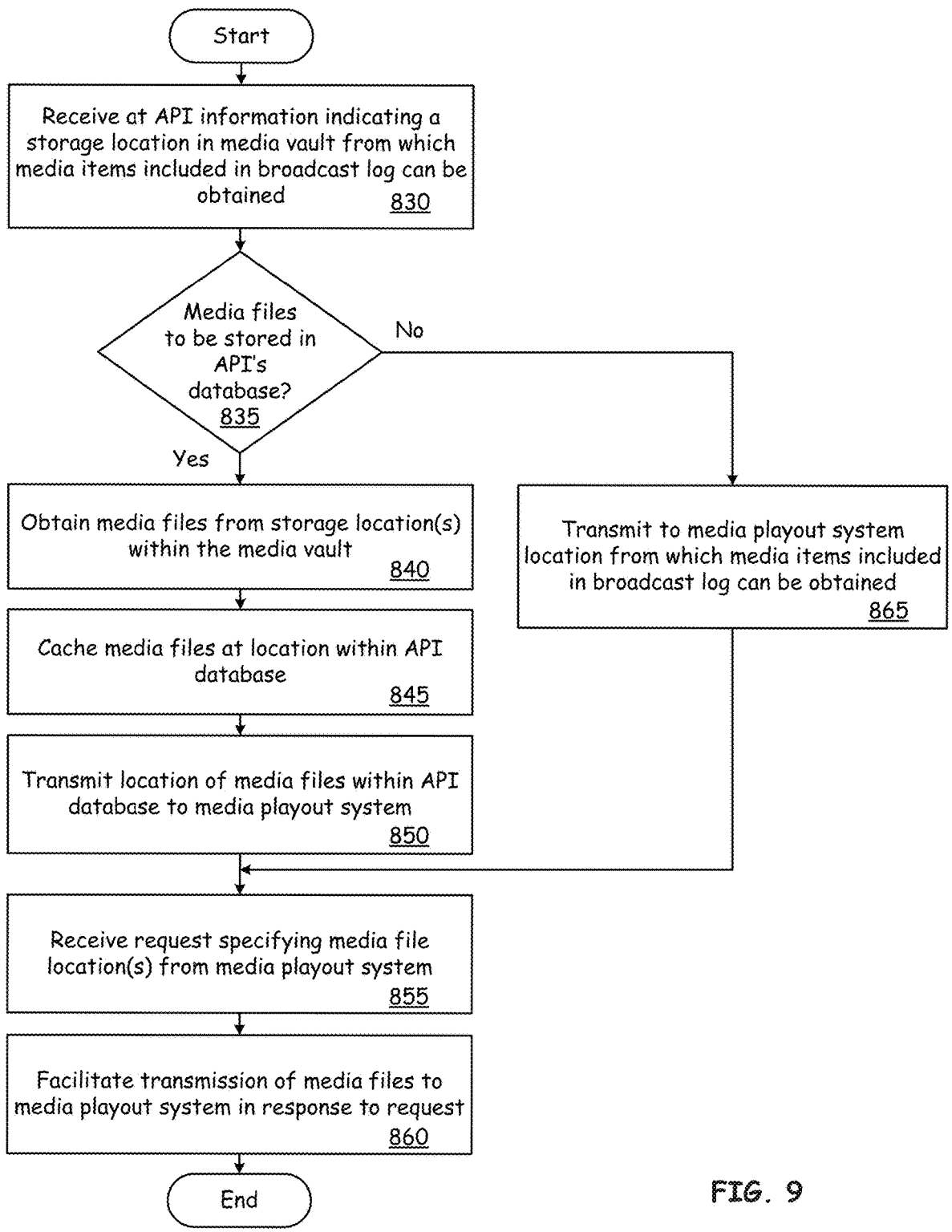
FIG. 9 is a flowchart illustrating a method of storing and transmitting media files in a media broadcast system in accordance with embodiments of the present disclosure.

Referring next to FIG. 9, a method of storing and transmitting media files in a media broadcast system will be discussed in accordance with embodiments of the present disclosure.

As illustrated by block 830, an API receives information indicating a storage location in a media vault from which media items included in a broadcast log can be obtained. The address can include, but is not limited to, a uniform resource locator (URL) to the media item itself, a URL to a table from which the address of the media item can be retrieved, a record identifier, or the like. In some embodiments, a message in which the API receives the information indicating a storage location in a media vault from which media items included in a broadcast log can be obtained can also include metadata associated with that URL.

As illustrated by block 835, a check can be made to determine if the API has previously retrieved the media item associated with a URL, and stored that media item in an API database, such as DAAPI database 125 (FIG. 3). This check can be performed by, for example, comparing metadata stored the API database with metadata included in the message received by the API. In other implementations, the URL itself provides sufficient information for the API to determine whether the media item has already been stored in the API database. In yet further embodiments, the API can maintain a log of previously accessed URLs, and a comparison of the received URL to the log of previously accessed URLs can be used as a basis for the decision.

As illustrated by block 840, if the media item identified by the URL is not already stored in the database, meaning that the media file for that media item is to be retrieved and stored in the API database, the API obtains the media file from storage in the media vault using the received address.

As illustrated by block 845, after obtaining the media file, the API caches or stores the media file within the API database. In this context, caching refers to storing the media file within the API database for a limited amount of time corresponding to hours, days, weeks, or months. Caching in this context is not intended to imply storing the data only for milliseconds or minutes. In at least one embodiment, the API will maintain a media file in storage within the API database at least as long as a media item corresponding to the media file is referenced in a current or upcoming broadcast log.

In various embodiments, the API can automatically remove the media file from storage in the API database a predetermined amount of time, for example 1 week, after the media item is no longer referenced in a current or upcoming broadcast log. By caching the media file in the API database for a limited period of time, instead of storing it permanently, the size of API database can be maintained at a manageable size, while still making the media file quickly accessible to the API.

As illustrated by block 850, the API can transmit the addresses of media files stored within the API database to playout systems, media automation systems, edge devices, and like. The addresses can be transmitted to the playout systems in conjunction with transmission of full or partial broadcast logs to those playout systems. For example, a partial broadcast log that specifics spots (advertisements) to be broadcast by a local media station during a given daypart can include metadata specifying address metadata indicating the location in the API database from which the spots can be retrieved. In some cases, the address metadata can be stored as media metadata associated with a media item, and the address metadata can be linked to particular spots (log positions) rather than being included in the log. The address of the media files corresponding to the media items referenced in the broadcast logs can be primary content, advertising content, or tertiary content.

In an example embodiment, a partial broadcast log including the address metadata for the spots (advertisements), or a partial broadcast log and separate media metadata linked to the partial broadcast log, are sent to a playout system 24 hours before the local media station is scheduled to broadcast the spots (advertisements). Note that the media files need not be transmitted at this time-just the partial broadcast log and the address metadata.

As illustrated by block 855, the API receives from the playout system a media item download request asking the API to transmit the media files included in the full or partial broadcast log. In various embodiments, the request will include the address of the media file within the API database. Continuing with the previous example, at some point after receiving the address of the media files included in the partial broadcast log, but before the media items identified in the partial broadcast log are scheduled to be broadcast and/or streamed, the playout system sends a download request to the API. The download request can include the address provided to the playout system by the API.

As illustrated by block 860, in response to receiving the media item download request from the playout system, the API facilitates transfer of media files from the API database, for example DAAPI media database 403 (FIG. 4), to the requesting playout system. Facilitating the transfer of the media files can include passing the media item download request to the API database, which will process the request and transmit the requested media files to the requesting playout system.

As illustrated by block 865, if the check at block 835 indicates that the media files are not to be stored in the API database, retrieval of the media files from the media vault can be bypassed by foregoing execution of blocks 840-850.

Figure 10:
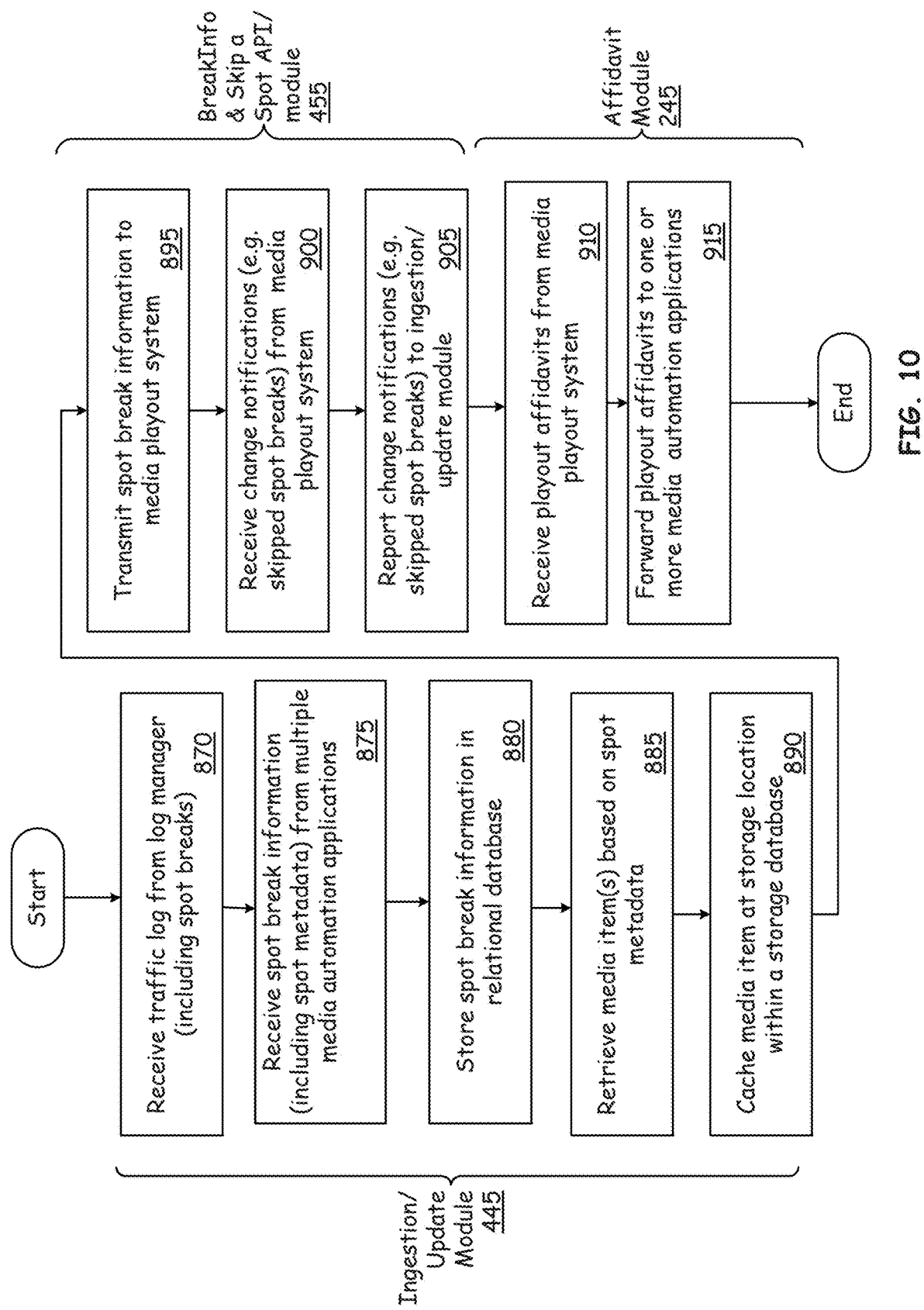
FIG. 10 is a flowchart illustrating operation of an application programming interface in a media broadcast system in accordance with embodiments of the present disclosure.

Referring next to FIG. 10, operation of an application programming interface (API) in a media broadcast system will be discussed in accordance with embodiments of the present disclosure. As illustrated in FIG. 10, blocks 870, 875, 880, 885, and 890 can be performed by an ingestion/update module 445 (FIG. 3), blocks 895, 900, and 905 can be performed by a break information module 455 (FIG. 3), and blocks 910 and 915 can be performed by affidavit module 245. Although illustrated as being performed by the listed modules, other suitable module arrangements can be used to provide the same or similar functionality.

As illustrated by block 870, an API receives a traffic log from a log manager. The traffic log, which is an example of a broadcast log, includes spot breaks. The term "spot break" refers to a group of one or more log positions reserved for insertion of media items that may or may not be advertising content. For example, a spot break may include log positions reserved for insertion of advertising content, log positions reserved for insertion of weather, traffic, or other primary content, and in some embodiments, log positions reserved for insertion of tertiary content. The traffic log may specify particular media items to be used to fill the spot breaks, or it may specify types or sources of media items. For example, a traffic log may specify that a first spot (log position) of a spot break is to be filled with programmatic advertisements obtained from PAS 130 (FIG. 5), specify that a second spot (log position) is to be filled with a weather report obtained from MPS 145 (FIG. 3), and preassign a particular media item to a third spot (log position) of the spot break.

As illustrated by block 875, the API receives spot break information, including spot metadata or other media item metadata, from multiple media automation applications. For example, the API can provide all or part of the traffic log to one or more media automation applications/services. The traffic log can be a partial or complete traffic log, and can include metadata that the media automation applications/services can use to select media items for insertion into traffic log. If the traffic log includes information indicating that a first spot (log position) of the spot break is to be filled with a weather report for the Dallas, Texas metroplex, the API can receive, spot break metadata from MPS 145 (FIG. 3), that identifies a media file including a weather report for north Texas. If the traffic log indicates that another spot (log position) in another spot break is reserved for an advertisement targeted to college-educated women between the ages of 26 and 29, then the API can receive, spot break metadata from PAS 130 (FIG. 3), that identifies a media file including an advertisement for a restaurant appealing to that demographic. In at least one embodiment, the spot break information includes an address from which a media item can be obtained, a creative identifier, and the like.

As illustrated by block 880, the API can store the spot break information in a relational database, such as RDS 450 (FIG. 3). As illustrated by block 885, the API can use the spot metadata included in the spot break information to retrieve the appropriate media files, for example from media manager 440 (FIG. 3). As illustrated by block 890, the API can cache the media items at a storage location within an API database, such as media storage database 128.

The API can also transmit some or all of the spot break information to a media playout system, such as broadcast system 472, as illustrated by block 895, which uses the spot break information to obtain media items for broadcast.

As illustrated by block 900, the playout system reports any differences between actually broadcast/streamed media items and media items scheduled for broadcast/streaming by the traffic log in a change notification. The API receives the change notification at Break Info & Skip a Spot API 455 (FIG. 3). As illustrated by block 905, Break Info & Skip a Spot API 455 can provide the change notification to ingestion/update module 445 (FIG. 3), provide the change notification to affidavits module/API 245, store portions of the information included in the change notification to RDS 450 (FIG. 3), store portions of the information included in the change notification to media storage database 128, or some combination of these actions.

Although not specifically illustrated in FIG. 10, ingestion/update module 445 and/or affidavits module 245 can forward some or all of the information included in the change notification to one or more of the advertisement automation micro-services included in Ad-Tech system 435 (FIG. 3).

As illustrated by block 910, the API, e.g., DAAPI 105, can receive playout affidavits from the media playout system. In at least one embodiment, affidavits differ from change notifications because change notifications can be used to report discrepancies in media item playout, while affidavits can include information reporting both discrepancies in media item playout and successful playout of media items.

As illustrated by block 915, the API forwards received affidavits to one or more media automation applications/services, which can use the affidavits for proof of playout, billing, future scheduling, calculating impressions, or the like.

Figure 11:
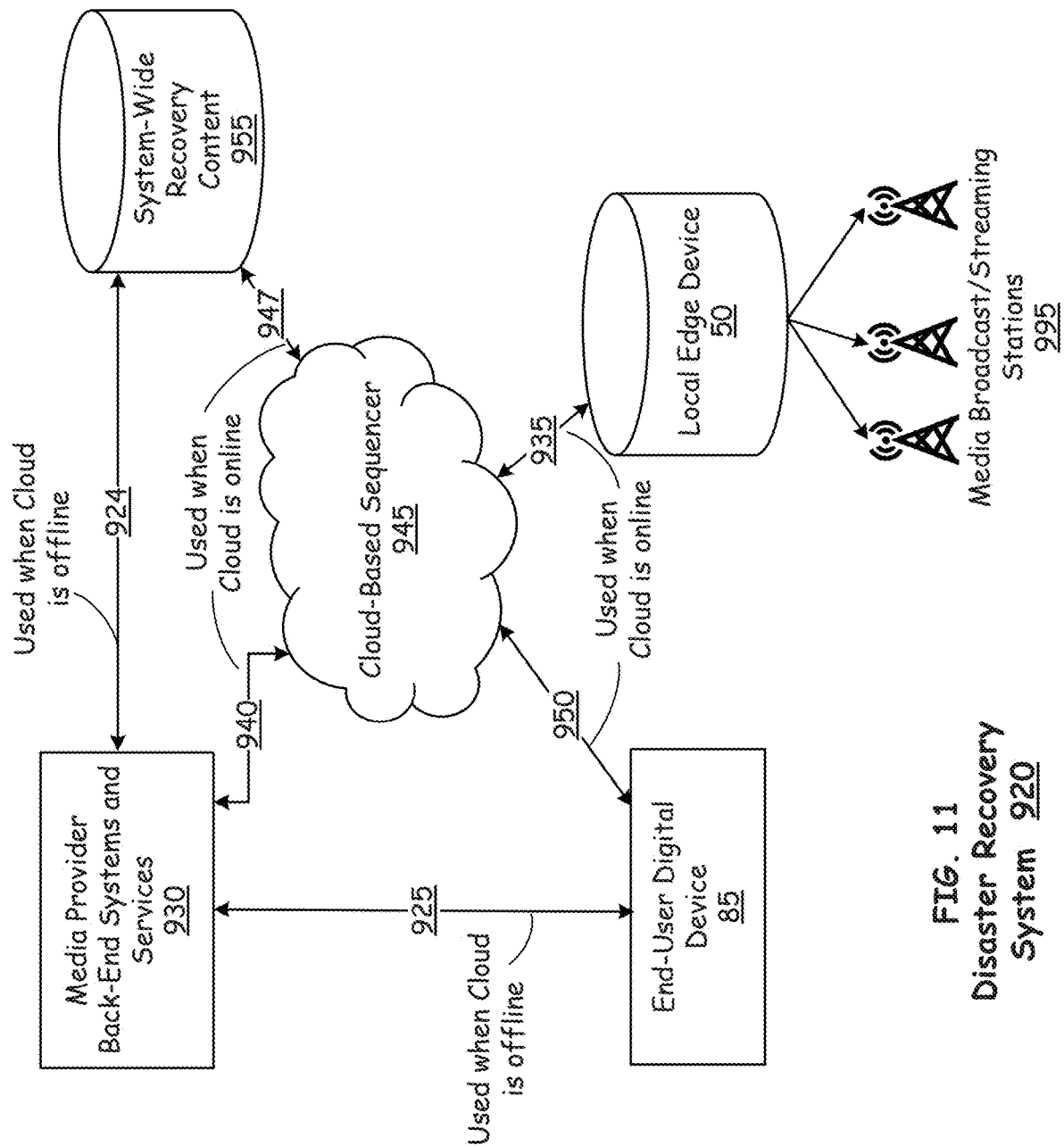
FIG. 11 is a schematic block diagram of a disaster recovery system in accordance with embodiments of the present disclosure.

Referring next to FIG. 11 a disaster recovery system 920 will be discussed in accordance with embodiments of the present disclosure. Disaster recovery system 920 includes media provider back-end systems and services 930, end-user digital device 85, cloud-based sequencer 945, system-wide recovery content 955, local edge device 50, and media broadcast/streaming stations 995.

During periods when cloud-based sequencer is operating normally, for example when there are no network disruptions or outages, cloud-based sequencer 945 communicates with media provider back-end systems and services 930 via communications path 940, and provides access to services provided by media provider back-end systems and services 930 through an API, such as master API 20 (FIG. 1) or DAAPI 105 (FIGS. 2-5), included in cloud-based sequencer 945. During normal operation, cloud-based sequencer 945 communicates with end-user digital device 85 via communications path 950, with system-wide recovery content 955 via communications path 947, and with local edge device 50 via communications path 935.

During periods of time when cloud-based sequencer 945 is unavailable, end-user digital device 85 accesses media provider back-end systems and services 930 via communications path 925. In some embodiments, when cloud-based sequencer 945 is unavailable media provider back-end systems and services 930 can access system-wide recovery content 955 via communications path 924. In at least one embodiment, during periods of time when cloud-based sequencer 945 is unavailable, local edge device 50 has no access to media provider back-end systems and services 930 or to system-wide recovery content 955.

In some embodiments, alternate communication pathways (not illustrated) can be provided between local edge device 50 and either or both of media provider back-end systems and services 930 and system-wide recovery content 955. However, in various embodiments described herein, alternate pathways are not necessary, because local edge device 50 can continue to provide broadcast automation services to media broadcast/streaming stations 995, even during periods when local edge device 50 is unable to access media provider back-end systems and services 930.

In various embodiments described herein, media provider back-end systems and services 930 include, but are not limited to: selection of media content including primary content, advertising content, and tertiary content; scheduling of the media content; generating broadcast logs designating particular media items for playout at particular times; obtaining media items designated by the broadcast logs; and maintaining records of actually broadcast or streamed media items. The services provided by media provider back-end systems and services 930 can be implemented using microservice applications implemented on one or more processing systems, or using other suitably configured processing systems. The media management system 425 illustrated in FIG. 2 shows various elements of media provider back-end systems and services 930, for example traffic/billing system 205, log manager 150, MPS 145, programmatic ad system (PAS) 130, syndication service 180, inventory management hub 175, media vault 190, media editor 230, and enterprise copy module 220, among others.

End-user digital device 85 can be smart phone, tablet, smart television, laptop, desktop, wearable computer, radio, set-top box, or any device capable of receiving and presenting digital media streams or broadcasts to an end user via a media presentation application being executed on the end-user digital device 85. In some embodiments, end-user digital device 85 can receive media items and assembly instructions from cloud-based sequencer 945 or media provider back-end systems and services 930, and fully or partially assemble a collection of media items that are presented by end-user digital device 85 to an end-user. In other embodiments, end-user digital device 85 can receive a media stream from cloud-based sequencer 945 or a streaming server included in media provider back-end systems and services 930, and present the media stream to the end user.

Cloud-based sequencer 945 provides API access to content, for example advertisements, songs, music, and video content; access to scheduling, traffic, and advertisement insertion services, as well as edge device management services. Cloud-based media management system 45 (FIG. 1) is an example of a cloud-based sequencer 945 illustrated in FIG. 11.

System-wide recovery content 955 can be implemented as one or more databases, such as DAAPI database 125, which can include RDS 450 and media storage database 128 as shown in FIG. 3. In various embodiments, system-wide recovery content 955 can be populated with broadcast-related information that is transmitted to one or more local edge devices 50 when access to cloud-based sequencer 945 has been restored after having been previously unavailable. Data can be stored in system-wide recovery content 955 by cloud-based sequencer 945 during normal operation, and by media provider back-end systems and services during periods of time when cloud-based sequencer 945 is unavailable to failure of one or more systems, network outages, or the like.

The data stored in system-wide recovery content 955 can include, but is not limited to, broadcast-related information transmitted to local edge device 50 by cloud-based sequencer 945, broadcast information transmitted to end-user digital device 85 from either cloud-based sequencer 945 or media provider back-end systems and services 930. In some embodiments, broadcast-related information that would otherwise have been transmitted from cloud-based sequencer 945 to local edge device 50 but-for a system failure or network outage that prevents local edge device 50 from receiving that broadcast information can be stored in system-wide recovery content 955. Upon recovery from the failure or network outage, the broadcast-related information stored in stored in system-wide recovery content 955 can be provided to local edge device 50 to bring local edge device 50 back to a current state. In effect, the broadcast-related information stored in stored in system-wide recovery content 955 allows local edge device 50 to find out "what is missed" when local edge device 50 was operating on its own. The broadcast-related information stored in system-wide recovery content 955 can include broadcast-related information for multiple edge device, multiple playout systems, and multiple media stations.

Local edge device 50 streams or otherwise provides media broadcasts to one or more media broadcast/streaming stations 995. In some embodiments, during normal operation a fully assembled media broadcast is received from cloud-based sequencer 945 at local edge device 50, and transmitted to one or more media broadcast/streaming stations 995. In some of those same embodiments, when local edge device 50 does not have access to cloud-based sequencer 945, local edge device 50 still provides a fully assembled media broadcast to media broadcast/streaming stations 995, but generates the fully assembled media broadcast itself based on locally stored broadcast-related information. In effect, local edge device 50 temporarily performs the functions normally provided cloud-based sequencer 945 during periods when access to cloud-based sequencer 945 is unavailable.

In various embodiments, local edge device 50 includes, among other things, a local sequencer, a local player, local content storage, and a local messaging service, and an offline controller. The local sequencer has functionality similar to cloud-based sequencer 945, and allows local edge device 50 to manage logs, obtain media items from local content storage, maintain a record of affidavits and change notifications, and manage messages. In at least one embodiment, when local edge device 50 determines when access to cloud-based sequencer 945 has been lost, the offline controller repoints communication endpoints from the cloud-based sequencer 945 to the local sequencer.

Figure 12:
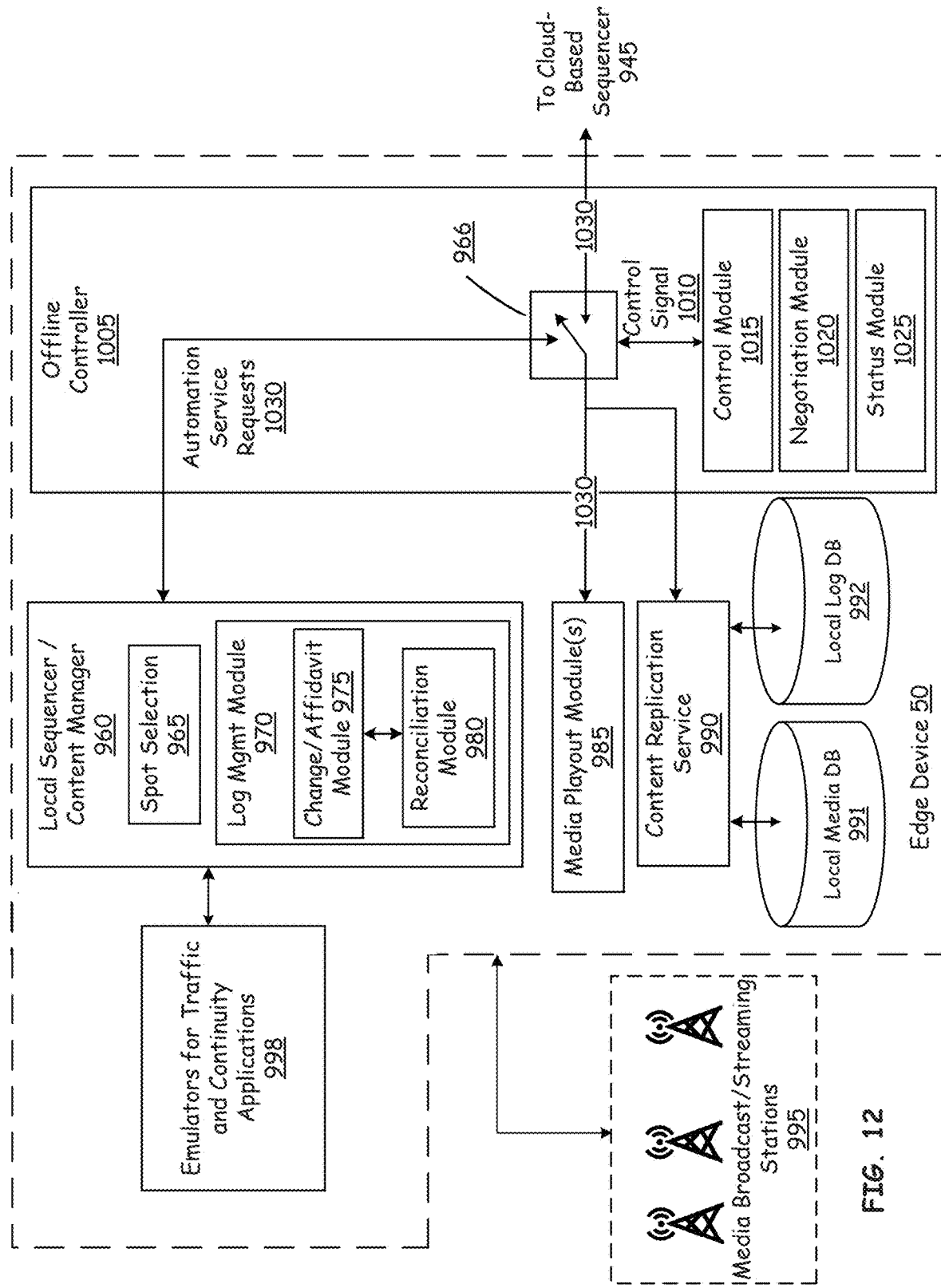
FIG. 12 is a schematic block diagram of an edge device in accordance with embodiments of the present disclosure.

Referring next to FIG. 12 an edge device 50 will be discussed in accordance with embodiments of the present disclosure. Edge device 50 includes local sequencer/content manager 960, offline controller 1005, media playout module 985, content replication service 990, emulators for traffic and continuity applications 998, local media database 991, and local log database 992. In various embodiments, when cloud-based sequencer 945 is on line and accessible to edge device 50, edge device 50 communicates with cloud-based sequencer 945, through various automation service requests 1030, to obtain one or more of the following: media items, broadcast logs, other broadcast-related information, fully or partially assembled broadcasts. Edge device also provides cloud-based sequencer 945 with change notification messages, affidavits, and other playout-related information received from media broadcast/streaming stations 995, or generated internally by edge device 50.

Edge device 50 streams or otherwise transmits fully assembled broadcasts to one or more of the media broadcast/streaming stations 995 based on information received from cloud-based sequencer 945. The fully assembled broadcasts transmitted from edge device 50 to media broadcast/streaming stations 995 can be the same fully assembled broadcasts received from cloud based sequencer 945, or edge device 50 can generate the fully assembled broadcasts using locally stored broadcast information and media items received from cloud based sequencer 945. In some embodiments the operational state of cloud-based sequencer 945 affects a determination by edge device 50 whether to generate fully assembled broadcasts for transmission to media broadcast/streaming stations 995. In other embodiments, edge device 50 generates the fully assembled broadcasts regardless of the operational state of cloud-based sequencer 945.

In various embodiments, offline controller 1005 controls whether automation service requests 1030 are routed to cloud-based sequencer 945 or to local sequencer/content manager 960. During periods of time when edge device 50 has access to cloud-based sequencer 945, automation service requests 1030 are routed to cloud-based sequencer 945. Automation service requests include requests for services provided by any of the media automation applications/services that can be accessed through an API included in cloud-based sequencer 945 (e.g., master API 20 of FIG. 1 and DAAPI 105 of FIGS. 2-5). Examples of media application/services accessed through the API are discussed with reference to FIGS. 1-10. Automation service requests can include, but are not limited to, requests for media files of primary media content, requests for original or updated logs, requests for media files of advertising content to be inserted into spot breaks, change requests/notifications, playout affidavits, or the like.

During periods of time when edge device 50 does have access to cloud-based sequencer 945, automation service requests 1030 are routed to cloud-based sequencer 945. During periods of time when edge device 50 does not have access to cloud-based sequencer 945, automation service requests 1030 are routed to local sequencer/content manager 960, which emulates, or replicates, the media automation services/applications. Emulating the media automation services/applications includes emulating the functions of the API included in cloud-based sequencer 945, so that local sequencer/content manager 960 receives the same automation service requests 1030 that would otherwise be received by cloud-based sequencer 945, and providing responses that are locally indistinguishable from responses that would have been provided by cloud-based sequencer 945, had cloud-based sequencer 945 been available.

For example, assume an automation service request 1030 for an advertisement to be inserted into a spot block of a broadcast log is routed to cloud-based sequencer 945 during a period of time when edge device 50 has access to cloud-based sequencer 945. Assume further that, in response to the automation service request 1030, that cloud-based sequencer 945 returns the following information: an address specifying a location from which the advertisement can obtained, a unique system identifier associated with the advertisement, and metadata associated with the advertisement.

If that same automation service request 1030 is routed to local sequencer/content manager 960 during a period of time when edge device 50 does not have access to cloud-based sequencer 945, the response from local sequencer/content manager 960 will also include: an address specifying a location from which the advertisement can obtained, a unique system identifier associated with the advertisement, and metadata associated with the advertisement.

The information included in the response to the automation service request 1030 routed to local sequencer/content manager 960 may be different than the information that would have been included in the response if the automation service request 1030 had been routed to cloud-based sequencer 945, but the potential differences will be transparent to the requestor, because the requestor has received the information it requested. The reason for the potential difference is that, in at least one embodiment, local sequencer/content manager 960 will be using locally stored information to emulate the response of the intended advertisement insertion application/service, which in this example cannot currently be accessed through cloud-based sequencer 945.

The locally stored content used by local sequencer/content manager 960 to generate the fully assembled media broadcasts can be obtained by content replication service 990 during periods of time when cloud-based sequencer 945 is accessible to edge device 50. In at least one embodiment, content replication service 990 obtains broadcast-related information, including media items and broadcast logs, in response to automation service requests 1030 generated by media playout module 985 or content replication service 990, and stores the information received in one or more local databases, such as local media DB 991 and local log DB 992.

In at least one embodiment, content replication service 990 stores 14 days of broadcast-related information, including logs and media items, including 7 days of broadcast-related information before a current time, and 7 days of broadcast-related information after a current time. Data older than 7 days can be deleted from storage. In various embodiments, the length of time past data is stored data can be varied based on storage capacity, and data stored for upcoming time periods can vary based on how far in advance broadcast-related information is available.

In implementations where cloud-based sequencer 945 and local sequencer/content manager 960 provide fully assembled media broadcasts, media playout module 985 transmits the fully assembled media broadcasts to media broadcast/streaming stations 995. In some implementations, however, cloud-based sequencer 945 and local sequencer/content manager 960 do not always provide fully assembled broadcasts, but instead can provide some combination of logs or log-related information, media-items, metadata, or partially assembled media broadcasts sufficient to allow media playout module 985 to generate a fully assembled media broadcast. In those implementations, when edge device 50 has access to cloud-based sequencer 945, media playout module 985 can generate fully assembled media broadcasts based on the information received from cloud-based sequencer 945, and transmit the fully assembled media broadcasts to media broadcast/steaming stations 995. Or when edge device 50 does not have access to cloud-based sequencer 945, media playout module 985 can generate fully assembled media broadcasts based on the information received from local sequencer/content manager 960, and transmits the fully assembled media broadcasts to media broadcast/steaming stations 995.

In some embodiments, a single media playout module 985 can serve more than one media broadcast/streaming stations

995. In other embodiments, a single media playout module 985 can provide dedicated service to a single media broadcast/streaming station.

Local sequencer/content manager 960 includes spot selection module 965, and log management module 970. Log management module 970 includes change/affidavits module 975 and reconciliation module 980. In various embodiments, spot selection module 965 emulates the combined functions of ingestion/update module 445, PAS 130, and MPS 145. In those same embodiments, log management module 970 emulates the combined functions of ingestion/update module 445 and log manager 150. In other embodiments, separate emulators, such as emulators for traffic and continuity applications 998, are used to emulate one or more traffic and continuity applications, such as PAS 130, MPS 145, and log manager 150.

For example, during periods of time when automation service requests 1030 are routed to local sequencer/content manager 960, spot selection module 965 receives from media playout module 985 spot information requests, which can include a request for spots (media items) to be inserted into spot breaks of a broadcast log. In response to receiving a spot information request, spot selection module 965 can forward the spot information request to emulators for traffic and continuity applications 998, which selects a spot for inclusion in the log, and provides a spot information response to spot selection module 965. Spot selection module 965 returns the spot information response to media playout module 985. The spot information response includes information indicating a location at which a spot (media item) referenced in a broadcast log can be retrieved from local media database 991. By way of contrast, a spot information response provided to media playout module 985 by cloud-based sequencer 945 would, in at least one embodiment, include information indicating a location at which the spot (media item) could be retrieved from DAAPI database 125.

In another example, during periods of time when automation service requests 1030 are routed to local sequencer/content manager 960, log management module receives from media playout module 985 spot information requests, which can include a request for log-related information, such as broadcast logs and metadata associated with the broadcast logs. In response to receiving a spot information request including a request for log-related information, spot selection module 965 can forward the request to emulators for traffic and continuity applications 998, which selects log-related information to be returned to media playout module 985, and transmits the log-related information to spot selection module 965. Spot selection module 965 returns the log-related information to media playout module 985.

In at least some embodiments, automation service requests 1030 can also include affidavits and change notifications generated by media playout module 985. Log management module 970 uses change/affidavits module 975, to perform/emulate the functions that would otherwise be performed by change notification module 120 (FIG. 2) and affidavits module/API 245 (FIG. 2). One difference between the functionality provided by change notification module 120 and affidavits module/API 245, which are included in cloud-based sequencer 945, and change/affidavits module 975, which is included in local sequencer/content manager 960, is that in some embodiments, change/affidavits module 975 stores change notifications and affidavits for later transmission by reconciliation module 980. In at least one embodiment, change/affidavits module 975 stores change notifications to local log database 992, until reconciliation module 980 transmits the change notification to cloud-based sequencer 945 in response to restoration of access to cloud-based sequencer 945. Although illustrated as a single module, change/affidavit module 975 can be implemented as separate modules and/or systems.

In some embodiments, emulators for traffic and continuity applications 998 and/or local sequencer/content manager 960 can be implemented as local versions of the various backend systems, media automation applications, or microservices to which cloud-based sequencer 945 provides access. In at least one embodiment, the functionality being emulated is more limited than that provided by the backend systems, media automation applications, or microservices being emulated. For example, simplified versions of advertisement targeting may be implemented to limit the processing resources needed. Or, in some implementations, there is a natural limitation imposed by the fact that edge device 50 is using locally stored media and log content, and may not have access to the full universe of potential media items available to the backend systems, media automation applications, or microservices being emulated.

In some implementations, emulators for traffic and continuity applications 998 can use simplified or different selection and scheduling algorithms than those used by the backend systems, media automation applications, or microservices being emulated. Assume, as noted previously, that 14 days of media content and logs are stored in the local databases available to edge device 50. Assume further that the broadcast logs for the current day are fully assembled broadcast logs, but that broadcast logs for the following day are incomplete.

Given the above assumptions, if access to cloud-based sequencer 945 is lost, media playout module 985 can simply transmit the current day's broadcast logs to media broadcast/streaming stations 995, because they are already fully assembled. However, if access to cloud-based sequencer 945 has not been restored by midnight, the following day's logs are not yet fully assembled, so media playout module 985 will send automation service requests 1030 to obtain media items needed to complete the following day's logs.

In response to those automation service requests 1030, local sequencer/content manager 960 can query emulators for traffic and continuity applications 998. The emulators can obtain the appropriate log and spot metadata from local log database 992, select a locally available media items from local media database 991 using the spot metadata, and provide the selection information to media playout module 985. Media playout module 985 can retrieve the media item from local media database 991, generate a fully assembled broadcast log, and transmit that fully assembled broadcast log to media broadcast/streaming stations 995. Information about media items selected for inclusion by emulators for traffic and continuity applications 998 can be stored by reconciliation module 980, for later reporting to cloud-based sequencer 945.

When access to cloud-based sequencer 945 is restored, reconciliation module 980 transfers information stored during the period of time cloud-based sequencer is offline to cloud-based sequencer 945, for delivery to the appropriate traffic and continuity applications, microservices, backend systems, etc. For example, any advertisements, primary content items, or tertiary items selected for insertion into broadcasts by local sequencer/content manager 960 can be transmitted to DAAPI 105 (FIG. 3) for delivery to log manager 150 (FIG. 3). Affidavits related to playout of programmatic advertisements during the time cloud-based sequencer 945 was unavailable can be transmitted to DAAPI 105 for delivery to both PAS 130 (FIG. 3) and log manager 150.

Reconciliation module 980 can also coordinate retrieval of broadcast-related information, such as media items and logs, which would have been received by edge device 50 but for the inability of edge device 50 to access cloud-based sequencer 945. In at least one embodiment, access to cloud-based sequencer 945 may be restored during a current media broadcast based on a log that was fully assembled during a time when cloud-based sequencer 945 was unavailable. In that case, upon reconnection with cloud-based sequencer 945, a new fully assembled media broadcast, which differs from the current media broadcast might be received by edge device 50. In such a case, media playout modules 985 can continue transmitting the current media broadcast, and report any differences between the current media broadcast and the new fully assembled media broadcast as change notifications. In some embodiments, the switchover from the current media broadcast and the new fully assembled media broadcast can be delayed until a spot break in the current media broadcast substantially aligns with a spot break in the new fully assembled media broadcast.

Offline controller 1005 includes a control module 1015, which controls a switch module 966 to route automation service requests 1030 to either cloud-based sequencer 945, or local sequencer/content manager 960 based on input from a negotiation module 1020 and a status module 1025. Status module 1025 detects whether edge device 945 can access cloud-based sequencer 945, and notifies control module 1015 to generate control signal 1010 in response to a total or partial loss of to cloud-based sequencer 945. In response to detecting a total lack of access to cloud-based sequencer 945, control module 1015 can instruct switch module 966 to reroute all automation service requests 1030 to local sequencer/content manager 960.

A partial loss of access includes an inability to access one or more of the media automation applications/services used by cloud-based sequencer 945. In the event of a partial loss of access, control module 1015 can reroute all automation service requests 1030 to local sequencer/content manager 960, or reroute only those automation service requests 1030 that rely on inaccessible media automation applications/services.

Determining whether cloud-based sequencer 945 is totally or partially inaccessible can be based on the content of messages received from cloud-based sequencer 945 or an edge device manager 35 (FIG. 1), the fact that one or more messages have been received from cloud-based sequencer 945 or an edge device manager 35, a failure to receive one or more messages from cloud-based sequencer 945 or an edge device manager 35, or some combination thereof. In some embodiments, network availability, status, and/or quality messages received from other devices can also be used by status module 1025 to determine when one or more automation service requests 1030 should be rerouted.

In cases where multiple edge devices have been unable to access cloud-based sequencer 945, each of the multiple edge devices can include a negotiation module 1015, to allow an orderly recovery of the edge devices to a current state. Note that the term "current state" refers to a state in which edge device 50 would be if access to cloud-based sequencer had not been lost. In this context, the term "current state" does not mean any state in which edge device 50 happens to be at the current time. Thus, for example, for edge device 50 to be in a current state, local media database 991 and local log database 992 will have stored all broadcast information, including media and logs, which would have been transmitted to edge device 50 by cloud-based sequencer 945 during the time that cloud-based sequencer 945 was partially or wholly unavailable, or inaccessible.

To bring edge device 50 into a current state, media items, logs, metadata, and other broadcast-related information may need to be obtained from cloud-based sequencer 945. In some implementations, cloud-based sequencer 945 may not be able to provide all broadcast information to every edge device at the same time. To prevent the case in which performance of cloud-based sequencer 945 is impacted by excessive requests for "missing" information, negotiation module 1020 can negotiate with other edge devices to determine a priority in which each edge device will transmit requests for cloud-based sequencer 945 to provide the missing information, or in some cases an order in which automation services requests 1030 are rerouted from local sequencer/content manager 960 to cloud-based sequencer 945. Negotiations among edge devices may or may not include the cloud-based sequencer.

Negotiation module 1020 of edge device 50 can establish a priority of reconnection based on an order in which the edge devices regained access to cloud-based sequencer, based on a collision handling process, similar to those implemented in Ethernet protocols; based on passing of a token, similar to Token ring protocols, based on how much broadcast related information is stored in a particular edge device, based on how much extra broadcast information will need to be provided by cloud-based sequencer, based on a priority of stations served by a particular edge device, based on a number if stations served by a particular edge device, based on network statistics associated with each particular edge device, based on a time zone, or based on some other factor distinguishing one edge device from another.

In at least one embodiment, negotiation between currently on-line sequencers, including local sequencers coming on-line after recovering from loss of access to the cloud-based sequencer, assists in rebalancing sequencer loads during reconnection of the local sequencers coming back on-line.

Figure 13:
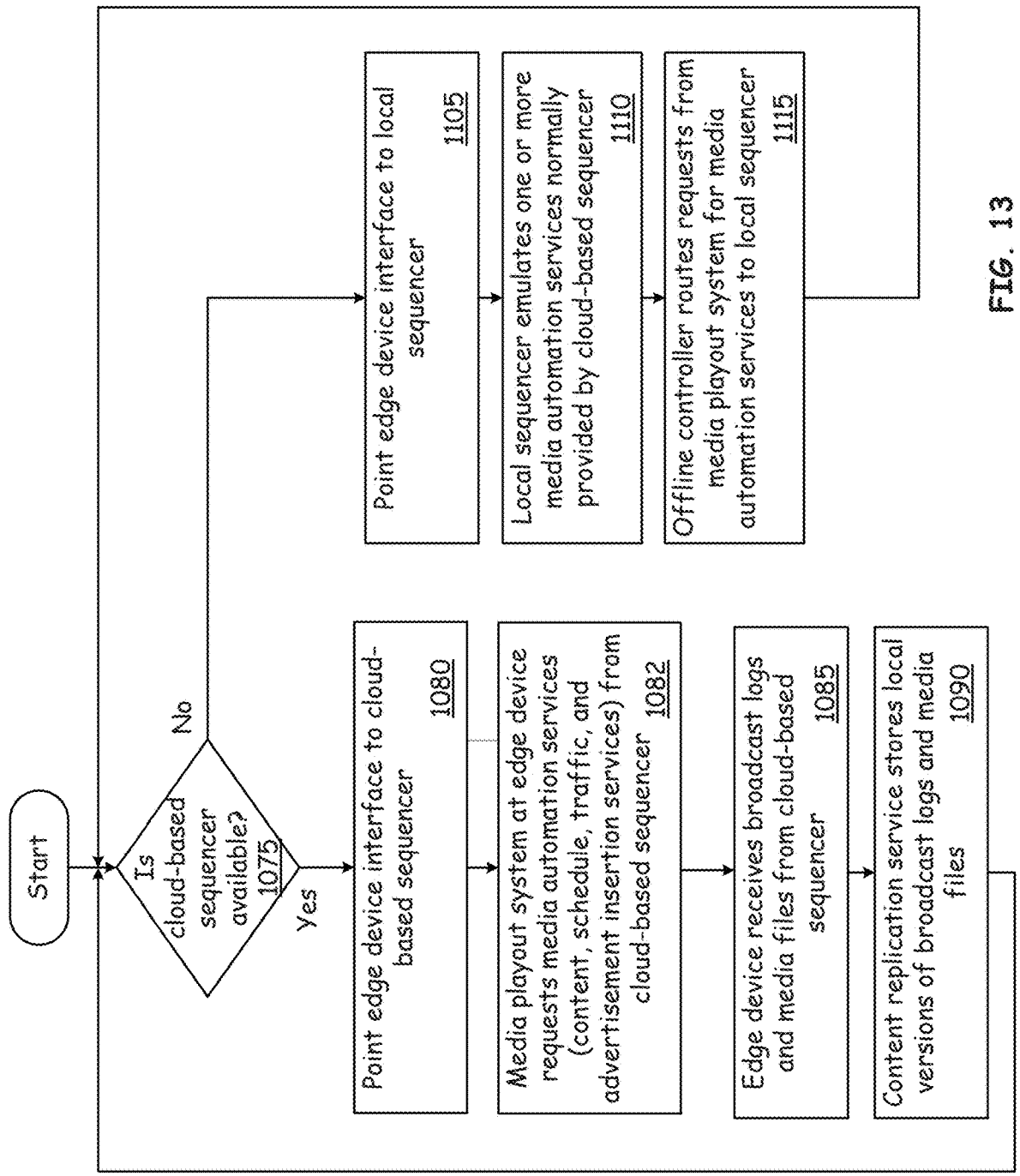
FIG. 13 is a flowchart illustrating a disaster recovery method implemented by an edge device in accordance with embodiments of the present disclosure.

Referring next to FIG. 13 a disaster recovery method implemented by an edge device will be discussed in accordance with embodiments of the present disclosure. As illustrated by block 1075, a check is made to determine if a cloud-based sequencer is available.

As illustrated by block 1080, if the check at block 1075 indicates that the cloud-based sequencer is available, an edge device interface is pointed to a cloud-based sequencer. Pointing the edge device interface to the cloud-based sequencer can include addressing automation service requests, affidavits, and or other messages related to obtaining broadcast content to the cloud-based sequencer.

As illustrated by block 1082, a media playout system served by the edge device requests media automation services from the cloud-based sequencer whenever the interface of the edge device is pointed to the cloud-based sequencer. Media automation services can include, but are not limited to the following: obtaining media content selection services; including selection of primary content advertising content, and tertiary content; scheduling services, including log generation services; media access services, including the ability to obtain selected media content; programmatic advertisement services; media creation services; traffic and billing services, or some combination of these and other services.

As illustrated by block 1085, the edge device receives broadcast-related content, such as broadcast logs, media files, and metadata from the cloud-based sequencer in response to requests sent to the cloud-based sequencer by the edge device. In some embodiments broadcast-related content can be pushed to the edge device by the cloud-based sequencer whenever the interface of the edge device is pointed to the cloud-based sequencer.

As illustrated by block 1090, local versions of broadcast logs, media files, and metadata are stored local to the edge device by a content replication services module. The method returns to block 1075, after content replication services module stores the broadcast-related content local to the edge device.

As illustrated by block 1105, if the check at block 1075 indicates that the cloud-based sequencer is unavailable, the edge device repoints its interface to a local sequencer. Pointing the edge device interface to the local sequencer can include addressing automation service requests, affidavits, and or other messages related to obtaining broadcast content to the local sequencer, instead of to the cloud-based sequencer.

As illustrated by block 1110, whenever the edge device interface is pointed to the local sequencer, the local sequencer emulates one or more media automation services that would normally be provided by the cloud-based sequencer. As illustrated by block 1115, whenever the edge device interface is pointed to the local sequencer an offline controller routes requests for media automation services from a media playout system served by the edge device to the local sequencer. The method returns to block 1075, where a check is made to determine whether the cloud-based sequencer has become available.

As illustrated by the combination of blocks 1075, 1080, and 1105, as long as the cloud sequencer is available, the interface of the edge device is pointed to the cloud-based sequencer, but when the cloud-based sequencer is unavailable, the interface of the edge device is pointed to a sequencer local to the edge device.

Figure 14:
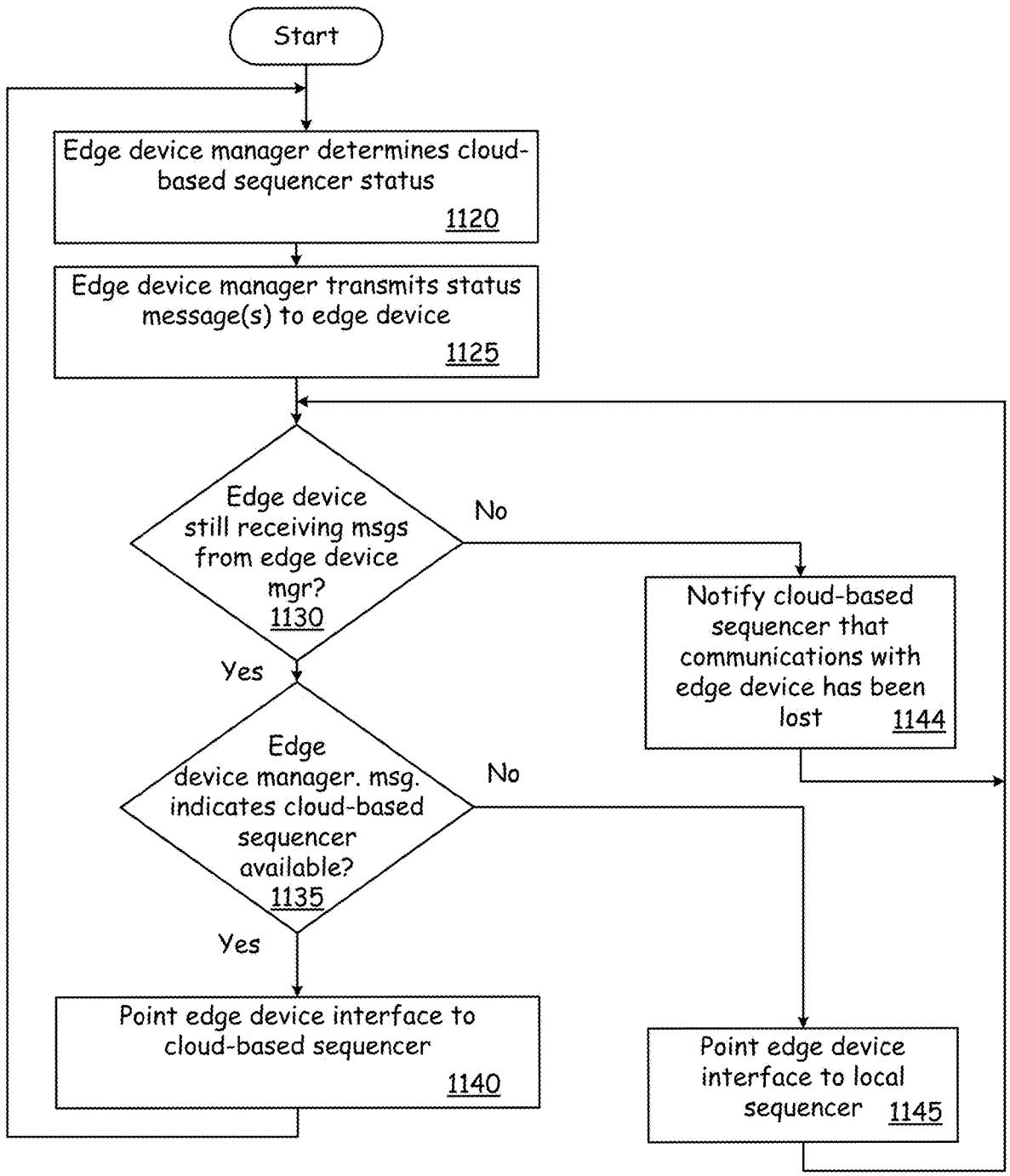
FIG. 14 is a flowchart illustrating a disaster recovery method implemented by an edge device manager in accordance with embodiments of the present disclosure.

Referring next to FIG. 14 a disaster recovery method implemented by an edge device manager, for example edge device manager 35 (FIG. 1) will be discussed in accordance with embodiments of the present disclosure. As illustrated by block 1120, an edge device manager determines a status of a cloud-based sequencer providing media automation services to an edge device. In some embodiments, edge device manager can determine the status of the cloud-based sequencer based on at least one of the following: content of a message received from the cloud-based sequencer, content of a message received from one or more edge devices being served by the cloud-based sequencer; the presence or absence of a message from the cloud-based sequencer; network outage messages; or failure of a cloud-based sequencer to respond, within a threshold amount of time, to a query transmitted to the cloud-based sequencer. Other suitable techniques can be used.

For example, edge device manager can transmit a log request from an edge device to the cloud-based sequencer. If the edge device manager does not receive a response within a predetermined period of time, the edge device manager can determine that the status of the cloud-based sequencer is "unavailable." If the cloud-based sequencer responds to requests for logs, but not requests for programmatic ad insertion, the edge device manager can determine that the status of the cloud-based sequencer is "partially unavailable." If the edge device manager receives a status message from the cloud-based sequencer indicating that the cloud-based sequencer is fully functional, the edge device manager can determine that the status of the cloud-based sequencer is "available." If the edge device manager receives a network message from a network router indicating that communication with the cloud-based sequencer has been lost, the edge device manager can determine that the status of the cloud-based sequencer is "unavailable." And so forth.

As illustrated by block 1125, the edge device manager transmits a status message to the edge device indicating the status of the cloud-based sequencer, as determined by the edge device manager. As indicated by block 1130, a check is made to determine whether the message sent by the edge device manager in block 1125 has been received by the managed edge device. This can be determined by, for example, by verifying that an acknowledgment message from the managed edge device has been received by the edge device manager.

If the edge device manager determines at block 1130 that the edge device manager is no longer capable of communicating with the managed edge device, a notification is sent to the cloud-based sequencer, as indicated by block 1144, and the method returns to block 1130, where communications between the edge device manager and the edge device being managed are monitored until communication has been reestablished.

As illustrated by block 1135, if the edge device is still receiving messages from the edge device manager, and the status of the cloud-based sequencer has been determined to be "unavailable," or in some embodiments "partially unavailable," the edge device manager transmits a message to the edge device, as shown in block 1145, that causes the edge device to point its interface(s) to a local sequencer. Note that in some embodiments employing an edge device manager, copies of messages and requests routed to the local sequencer can also be sent to the edge device manager to be place in a queue when the status of the cloud-based sequencer changes back to available.

As illustrated by block 1140, if the edge device is still receiving messages from the edge device manager, and the status of the cloud-based sequencer has been determined to be "available," the edge device manager transmits a message to the edge device that causes the edge device to point its interface(s) to the cloud-based sequencer.

Figure 15:
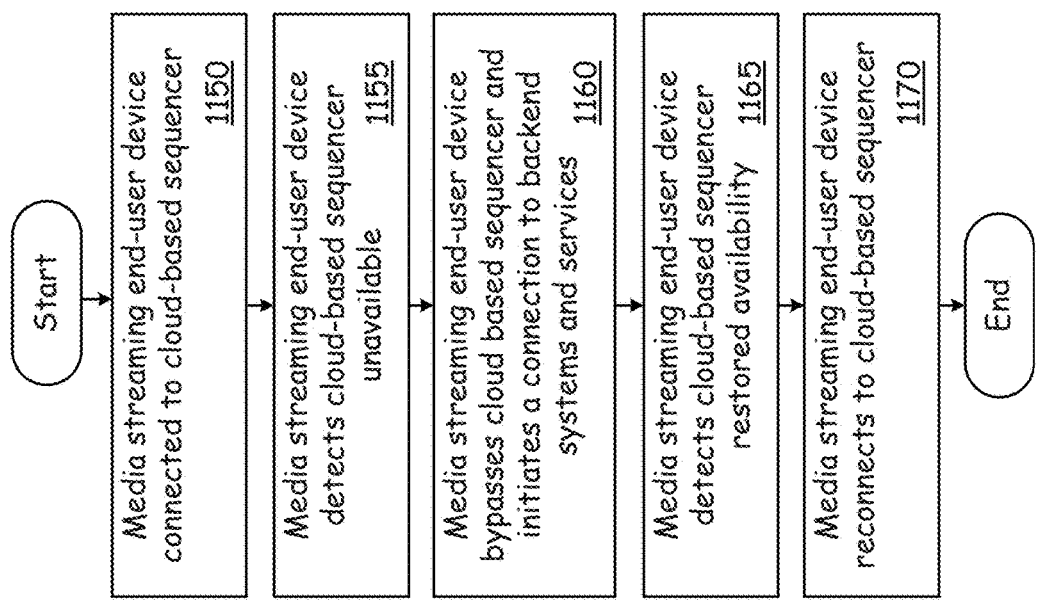
FIG. 15 is a flowchart illustrating a disaster recovery method implemented by an end-user device in accordance with embodiments of the present disclosure.

Referring next to FIG. 15 a disaster recovery method implemented by an end-user device will be discussed in accordance with embodiments of the present disclosure. As illustrated by block 1150, a media streaming end-user device, such as end-user digital device 85 (FIG. 11) is connected to a cloud-based sequencer, such as cloud-based sequencer 945 (FIG. 11), which provides a media stream for playout by the end-user device.

As illustrated by block 1155, media streaming end-user device detects that the cloud based sequencer is unavailable. In at least one embodiment, unavailability of the cloud-based sequencer is indicated by a lack of streaming media content being received by streaming end-user media device. As illustrated by block 1160, in response to detecting that the cloud-based sequencer is unavailable, the media streaming end-user device bypasses the cloud based sequencer and connects directly to the backend systems and services used by the cloud-based sequencer, e.g., media provider back-end systems and services 930. For example, if streaming end-user device is receiving a media stream through a cloud-based streaming service, and the cloud-based streaming service goes offline, and stops transmitting a media stream to the streaming end-user device, requests for media streams formerly being sent to the cloud-based streaming service can be sent directly to the backend systems that are providing the media streams to the cloud-based streaming service.

In some embodiments, connecting directly to the back end systems may result in some loss of customization, but will still allow the streaming end-user device to receive a "basic" media stream. For example, if a user is listening to an 80's radio station customized to include customized news, weather, and traffic, the user may still be able to receive the 80's station without the customized news, weather, and traffic. However, in other embodiments, the backend systems can request stream customization information directly from the media streaming end-user device.

Furthermore, in embodiments where the streaming end-user device is capable of locally assembling a customized stream using broadcast-related information obtained from the cloud-based sequencer, the streaming end-user device can repoint its interfaces to the backend systems, and receive substantially the same broadcast-related information it would otherwise have received from the cloud-based sequencer.

As illustrated by block 1165, in at least one embodiment, even when receiving a stream and/or broadcast related information from the backend systems, the streaming end-user device can continue sending requests to the cloud based sequencer at various intervals to detect when the cloud-based sequencer comes back online.

As illustrated by block 1170, when the streaming end-user device detects that the cloud based sequencer is once again available, the streaming end-user device disconnects from the backend systems and reconnects to the cloud-based sequencer.

Figure 16:
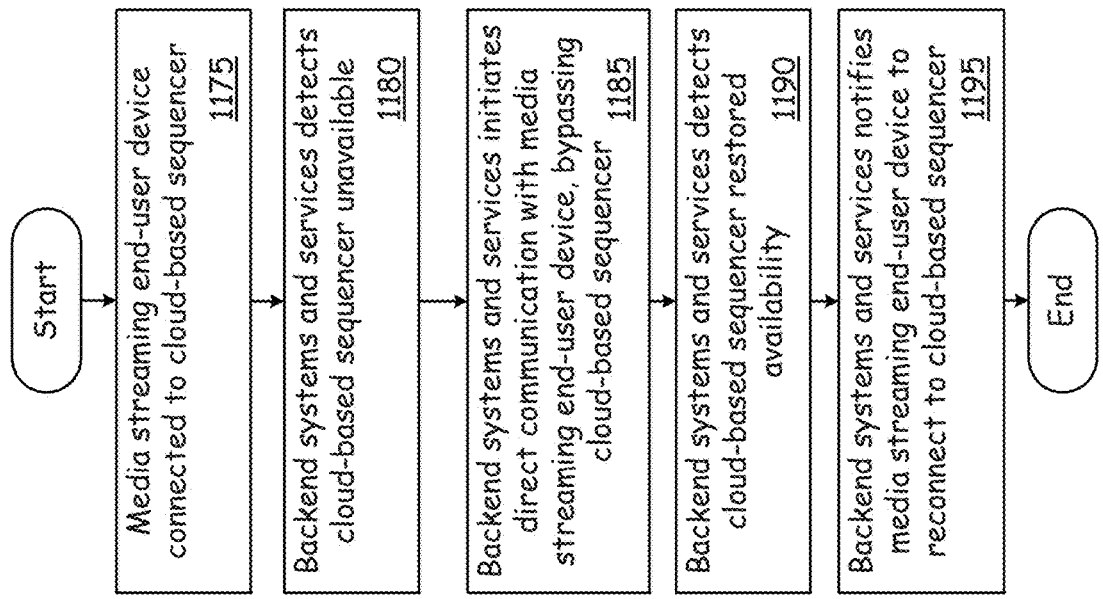
FIG. 16 is a flowchart illustrating a disaster recovery method implemented by backend systems and an end-user device in accordance with embodiments of the present disclosure.

Referring next to FIG. 16 a disaster recovery method implemented by backend systems and an end-user device will be discussed in accordance with embodiments of the present disclosure. As illustrated by block 1175, a media streaming end-user device, such as end-user digital device 85 (FIG. 11) is connected to a cloud-based sequencer that provides a media stream for playout by the end-user device.

As illustrated by block 1180 backend systems, such as media provider back-end systems and services 930 used by cloud-based sequencer, such as cloud-based sequencer 945 (FIG. 11), detects that the cloud-based sequencer is unavailable. The backend systems can detect that the cloud-based sequencer is unavailable if it stops receiving service requests from the cloud-based sequencer, if the cloud-based sequencer fails to respond to a message from the backend systems, or the like.

As illustrated by block 1185, in response to the backend systems detecting that the cloud-based sequencer is unavailable, the backend system can initiate direct communication with the media streaming end-user device, thereby ensuring that the media streaming end-user device receives the same, or a similar, media stream as it was receiving from the cloud-based sequencer. Initiating direct communication with the media streaming end-user device can include transmitting a query to the last known address of the media streaming end-user device.

The query can include a request for the media streaming end-user device to provide the backend system with information identifying the last media item received from the cloud-based sequencer, information about stream customization parameters, or the like. In other embodiments, the customization information can be obtained from previous requests received from the cloud-based sequencer. This customization information allows the backend systems to provide a substantially fully customized media stream to the media streaming end-user device. In some embodiments, for example where the media streaming end-user device is capable of assembling the stream locally using received broadcast-related information, the backend system can receive and respond to requests for broadcast-related information received directly from the media streaming end-user device.

As illustrated by block 1190, in at least one embodiment, the backend systems continually monitor the availability of the cloud-based sequencer to detect when the availability of the cloud-based sequencer has been restored.

As illustrated by block 1195, when the backend systems detects that the cloud based sequencer is once again available, the backend systems notify the media streaming end-user device to disconnect from the backend systems and reconnect to the cloud-based sequencer.

Figure 17:
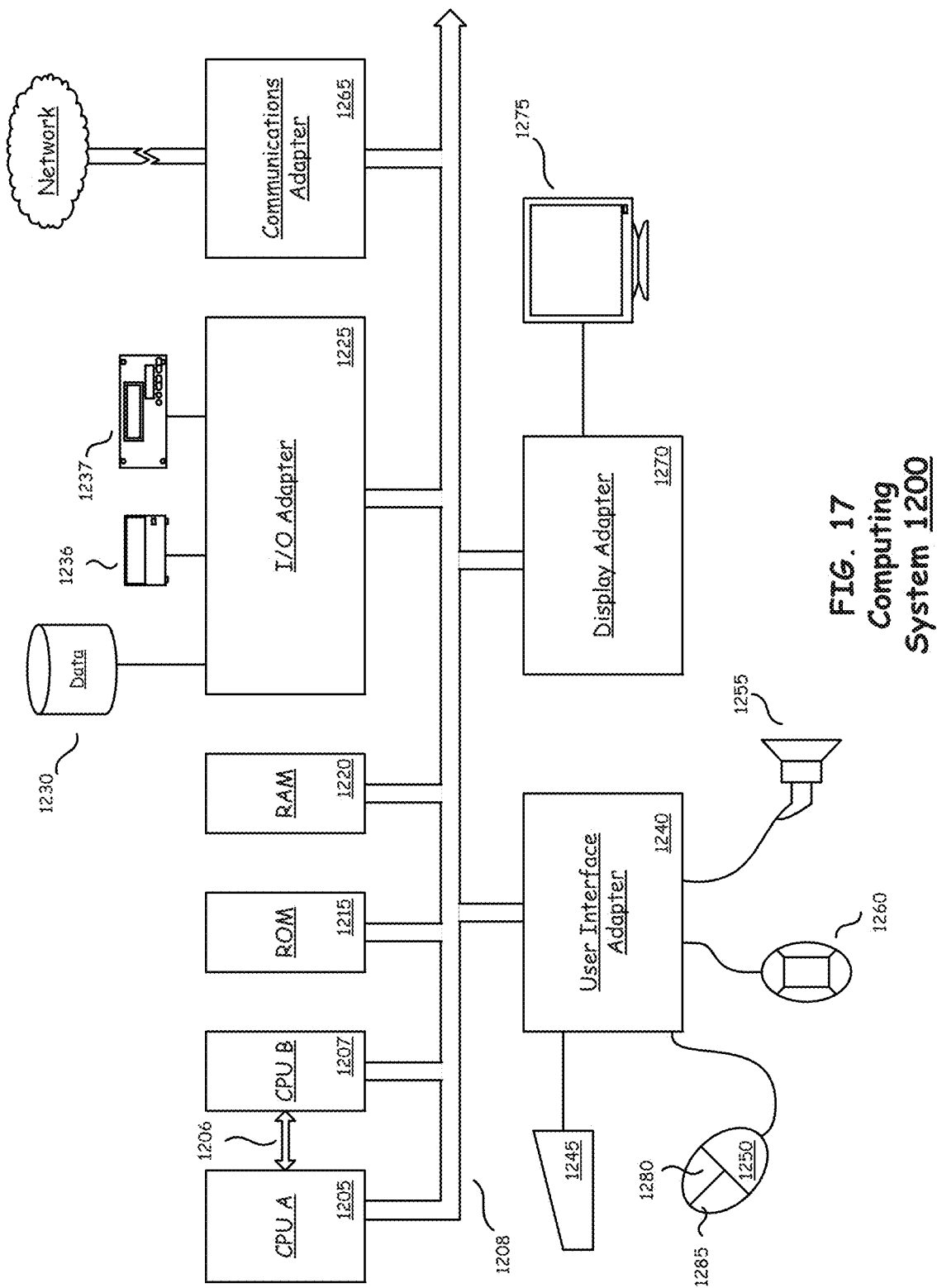
FIG. 17 is a high-level block diagram of a processing system according to embodiment of the present disclosure.

Referring now to FIG. 17, a high-level block diagram of a processing system is illustrated and discussed. Methods and processes and other embodiments discussed previously may be implemented in a processing system executing a set of instructions stored in memory, or on a removable computer readable medium. An example of a processing system according to some embodiments is illustrated in FIG. 17. Computing system 1200 includes one or more central processing units, such as CPU A 1205 and CPU B 1207, which may be conventional microprocessors interconnected with various other units via at least one system bus 1208. CPU A 1205 and CPU B 1207 may be separate cores of an individual, multi-core processor, or individual processors connected via a specialized bus 1206. In some embodiments, CPU A 1205 or CPU B 1207 may be a specialized processor, such as a graphics processor, other co-processor, or the like.

Computing system 1200 includes random access memory (RAM) 1220; read-only memory (ROM) 1215, wherein the ROM 1215 could also be erasable programmable read-only memory (EPROM) or electrically erasable programmable read-only memory (EEPROM); and input/output (I/O) adapter 1225, for connecting peripheral devices such as disk units 1230, optical drive 1236, or tape drive 1237 to system bus 1208; a user interface adapter 1240 for connecting keyboard 1245, mouse 1250, speaker 1255, microphone 1260, or other user interface devices to system bus 1208; communications adapter 1265 for connecting processing system 1200 to an information network such as the Internet or any of various local area networks, wide area networks, telephone networks, or the like; and display adapter 1270 for connecting computing system bus 1208 to a display device such as monitor 1275. Mouse 1250 has a series of buttons 1280, 1285 and may be used to control a cursor shown on monitor 1275.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitudes of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to."

As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably," indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c," with more or less elements than "a," "b," and "c." In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b," "a" and "c," "b" and "c," and/or "a," "b," and "c."

As may also be used herein, the terms "processing module," "processing circuit," "processor," "processing circuitry," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or may further include memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition-requires "artificial" intelligence—i.e., machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis, or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically," "automatically based on" and/or "automatically in response to" such a triggering event. Furthermore, any such actions identified in such a fashion specifically preclude the operation of human activity with respect to these actions-even if the triggering event itself may be causally connected to a human activity of some kind.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
   providing a media playout system access to a plurality of media automation services via a master API, wherein the media playout system transmits media station content to end-users;
   transmitting, from the master API to the media playout system, at least one media delivery schedule indicating scheduled media items to be transmitted by the media playout system to the end-users;
   receiving, at the master API, a change request from a first media playout system, wherein the change request indicates a requested change in one or more media items scheduled for transmission by the media playout system to the end-users;
   transmitting the change request from the master API to a first media automation service selected by the master API based on the requested change;
   receiving, at the master API from the first media automation service, updated media delivery information responsive to the change request; and
   transmitting the updated media delivery information from the master API to the first media playout system.

2. The method of claim 1, wherein:
   the change request includes a request to modify scheduling of a programmatic advertisement; and
   transmitting the change request from the master API to the first media automation service includes transmitting the request to modify scheduling of the programmatic advertisement to a programmatic advertisement system.

3. The method of claim 2, further including:
   transmitting the request to modify scheduling of the programmatic advertisement from the master API to a second media automation service, wherein the second media automation service includes a log manager.

4. The method of claim 1, wherein:
   the change request includes a request for an updated broadcast log; and
   receiving the updated media delivery information responsive to the change request includes receiving the updated broadcast log.

5. The method of claim 4, wherein:
   receiving the updated broadcast log includes receiving, at an ingestion update module of the master API, a notification from a log manager indicating that an updated log is ready to be retrieved; and
   retrieving, by the ingestion update module of the master API, the updated broadcast log from the log manager.

6. The method of claim 1, further comprising:
   storing, by the master API, the updated media delivery information in one or more databases accessible via the master API.

7. The method of claim 1, further comprising:
   in response to receiving the updated media delivery information indicating that broadcast of a media item is to be changed, transmitting a change notification to a second media automation service different than the first media automation service.

8. A processing device, comprising:
   a processor;
   memory coupled to the processor;
   a program of instructions configured to be stored in the memory and executed by the processor to implement a master API, wherein the master API is configured to
   provide a media playout system access to a plurality of media automation services via the master API, wherein the media playout system transmits media station content to end-users;
   transmit, to the media playout system, at least one media delivery schedule indicating scheduled media items to be transmitted by the media playout system to the end-users;
   receive, at the master API, a change request from a first media playout system, wherein the change request indicates a requested change in one or more media items scheduled for transmission by the media playout system to the end-users;
   transmit the change request from the master API to a first media automation service selected by the master API based on the requested change;
   receive, at the master API from the first media automation service, updated media delivery information responsive to the change request; and
   transmit the updated media delivery information from the master API to the first media playout system.

9. The processing device of claim 8, wherein:
   the change request includes a request to modify scheduling of a primary content media item; and
   transmitting the change request from the master API to the first media automation service includes transmitting the request to modify scheduling of the primary content media item to a media manager.

10. The processing device of claim 9, further including:
    transmitting the request to modify scheduling of the primary content media item from the master API to a second media automation service, wherein the second media automation service includes a log manager.

11. The processing device of claim 8, wherein:
    the change request includes a request for an updated broadcast log; and
    receiving the updated media delivery information responsive to the change request includes receiving the updated broadcast log.

12. The processing device of claim 11, wherein:
    receiving the updated broadcast log includes receiving, at an ingestion update module of the master API, a notification from a log manager indicating that an updated log is ready to be retrieved; and
    retrieving, by the ingestion update module of the master API, the updated broadcast log from the log manager.

13. The processing device of claim 8, further comprising:
    storing, by the master API, the updated media delivery information in one or more databases accessible via the master API.

14. The processing device of claim 8, further comprising:
receiving, at the master API, an additional change request from the first media playout system;
transmitting the additional change request from the master API to the first media automation service;
receiving, at the API, a denial of the additional change request; and
sending a denial notification to the first media playout system in place of the updated media delivery information in response to the denial.

15. A method comprising:
providing a media playout system access to a plurality of media automation services via a master API, wherein the media playout system transmits media station content to end-users;
transmitting, from the master API to the media playout system, at least one media delivery schedule indicating scheduled media items to be transmitted by the media playout system to the end-users;
receiving, at the master API, a change request from a first media playout system, wherein the change request indicates a requested change in one or more media items scheduled for transmission by the media playout system to the end-users;
transmitting the change request from the master API to the plurality of media automation services selected by the master API based on the requested change;
receiving, at the master API from the plurality of media automation services, updated media delivery information responsive to the change request; and
transmitting the updated media delivery information from the master API to the first media playout system.

16. The method of claim 15, wherein:
transmitting the change request from the master API to the plurality of media automation services includes transmitting the change request to a log manager.

17. The method of claim 16, wherein:
transmitting the change request from the master API to the plurality of media automation services includes transmitting the change request to a programmatic advertisement system.

18. The method of claim 16, wherein:
transmitting the change request from the master API to the plurality of media automation services includes transmitting the change request to a media automation service.

19. The method of claim 18, wherein:
receiving the updated media delivery information at the master API includes receiving an updated primary content item from the media automation service.

20. The method of claim 16, wherein:
receiving the updated media delivery information at the master API includes receiving an updated broadcast log from the log manager.

* * * * *